(12) United States Patent
Kimura

(10) Patent No.: US 8,184,377 B2
(45) Date of Patent: May 22, 2012

(54) ZOOM LENS AND IMAGE PICKUP APPARATUS INCLUDING THE SAME

(75) Inventor: Tomonori Kimura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 63 days.

(21) Appl. No.: 12/940,743

(22) Filed: Nov. 5, 2010

(65) Prior Publication Data

US 2011/0141577 A1 Jun. 16, 2011

(30) Foreign Application Priority Data

Dec. 11, 2009 (JP) ................................ 2009-281431

(51) Int. Cl.
*G02B 15/14* (2006.01)
*H04N 5/262* (2006.01)

(52) U.S. Cl. ...... 359/684; 359/683; 359/685; 348/240.3

(58) Field of Classification Search ............... 348/240.3, 348/335, 340; 359/683, 684, 685
See application file for complete search history.

(56) References Cited

U.S. PATENT DOCUMENTS

| 6,124,972 A | 9/2000 | Hayakawa et al. |
| 7,177,092 B2 | 2/2007 | Satori et al. |
| 2011/0080653 A1* | 4/2011 | Kimura ..................... 359/683 |

* cited by examiner

*Primary Examiner* — David N Spector
(74) *Attorney, Agent, or Firm* — Rossi, Kimms & McDowell LLP

(57) ABSTRACT

A zoom lens includes, in order from an object-side to an image-plane-side: a positive first lens unit; a negative second lens unit; a stop; a positive third lens unit; a negative fourth lens unit; and a positive fifth lens unit, wherein: during zooming, the first lens unit moves along a locus convex toward the image-plane-side, the second lens unit moves toward the image-plane-side, and the stop moves; at the telephoto end compared with the wide angle end, an interval between the first lens unit and the second lens unit increases, an interval between the second lens unit and the third lens unit decreases, and an interval between the aperture stop and the third lens unit decreases, focal lengths of the fourth lens unit, a focal length of an entire system at the telephoto end, and a movement amount of the first lens unit are appropriately set.

14 Claims, 19 Drawing Sheets

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable, in particular, for an image pickup apparatus using a solid-state image pickup element, such as a video camera, an electronic still camera, a broadcasting camera or a monitor camera, or an image pickup apparatus such as a silver-halide film camera.

2. Description of the Related Art

In recent years, an image pickup apparatus using a solid-state image pickup element, such as a video camera, a digital still camera, a broadcasting camera, or a monitor camera, as well as a silver-halide film camera has high performance, and the entire apparatus is downsized. Then, a photographing optical system used for the image pickup apparatus is required to be a high-resolution zoom lens having a short total lens length, a compact size, and a high zoom ratio. As one of the zoom lens which meet the requirements, there is known a so-called rear focus type zoom lens, which performs focusing by moving lens units other than a first lens unit on the object side.

In general, a rear focus type zoom lens has a smaller effective diameter of the first lens unit than other type of zoom lens that performs focusing by moving the first lens unit, so as to realize a small size of the entire lens system easily. In addition, close-up shooting, particularly, super close-up shooting becomes easy. Further, because a small and light lens unit is moved, small drive force of the lens unit is sufficient so that a quick focusing can be realized. As the rear focus type zoom lens, there is known a zoom lens including, in order from the object side to the image side, a first lens unit having positive refractive power, a second lens unit having negative refractive power, a third lens unit having positive refractive power, and subsequent one or more lens units. Among them, there is known a five-unit zoom lens including five lens units which have, in order from the object side to the image side, positive, negative, positive, negative, and positive refractive powers (U.S. Pat. No. 7,177,092). In addition, there is known a six-unit zoom lens including six lens units having positive, negative, positive, negative, positive, and negative refractive powers in order from the object side to the image side (U.S. Pat. No. 6,124,972).

In general, in order to obtain a zoom lens having a downsized entire system while having a predetermined zoom ratio, refractive power (optical power=inverse number of a focal length) of each lens unit constituting the zoom lens needs to be enhanced to reduce the number of lenses. However, such a zoom lens has much aberration variation accompanying zooming, and it is difficult to obtain high optical performance over the entire zoom range. In addition, if a movement amount of the lens unit for zooming is increased for realizing a high zoom ratio, the total lens length and the front lens effective diameter are increased, and it is difficult to obtain high optical performance over the entire zoom range.

In order to realize a high zoom ratio and downsize the entire lens system while obtaining good optical performance in the five-unit zoom lens or the six-unit zoom lens described above, it is important to appropriately set refractive power of each lens unit and a move condition of each lens unit during zooming. In particular, it is important to appropriately set refractive power of the fourth lens unit and move conditions of the first lens unit during zooming. Unless those structures are set appropriately, it is difficult to obtain a zoom lens having a small entire system, a wide field angle, a high zoom ratio, and high optical performance.

SUMMARY OF THE INVENTION

A zoom lens according to the present invention includes in order from an object side to an image plane side: a first lens unit having positive refractive power; a second lens unit having negative refractive power; an aperture stop; a third lens unit having positive refractive power; a fourth lens unit having negative refractive power; and a fifth lens unit having positive refractive power, in which: during zooming from a wide angle end to a telephoto end, the first lens unit moves along a locus convex toward the image plane side, the second lens unit moves toward the image plane side, and the aperture stop moves; at the telephoto end compared with the wide angle end, an interval between the first lens unit and the second lens unit increases, an interval between the second lens unit and the third lens unit decreases, and an interval between the aperture stop and the third lens unit decreases; and the following conditional expressions are satisfied:

$$0.10 < |f4/ft| < 0.45; \text{ and}$$

$$0.03 < m1\text{mid}/|m1| < 0.70,$$

where f4 denotes a focal length of the fourth lens unit, ft denotes a focal length of an entire system at the telephoto end, m1 denotes a movement amount of the first lens unit in an optical axis direction during zooming from the wide angle end to the telephoto end, and m1mid denotes a movement amount of the first lens unit in the optical axis direction from the wide angle end to a zoom position at which the first lens unit is positioned closest to the image plane side.

According to the present invention, it is possible to obtain the zoom lens having a small entire optical system, a wide field angle, a high zoom ratio, and high optical performance over the entire zoom range.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Hereinafter, a zoom lens according to the present invention and an image pickup apparatus including the same are described. The zoom lens according to the present invention includes at least five lens units, which are, in order from an object side to an image side, a first lens unit having positive refractive power, a second lens unit having negative refractive power, an aperture stop, a third lens unit having positive refractive power, a fourth lens unit having negative refractive power, and a fifth lens unit having positive refractive power. There is also a case where a sixth lens unit having positive or negative refractive power is disposed on the image side of the fifth lens unit. At least the first lens unit and the second lens unit move during zooming.

Specifically, during zooming from the wide angle end to the telephoto end, the first lens unit moves along a locus convex toward an image plane side so that an interval between the first lens unit and the second lens unit increases while an interval between the second lens unit and the third lens unit decreases at the telephoto end compared with the wide angle end. In addition, the second lens unit moves to the image plane side. The aperture stop moves so that an interval of the third lens unit changes. If the sixth lens unit is disposed on the image side of the fifth lens unit, the sixth lens unit does not move for zooming but may move if necessary for aberration correction.

Figure 1:
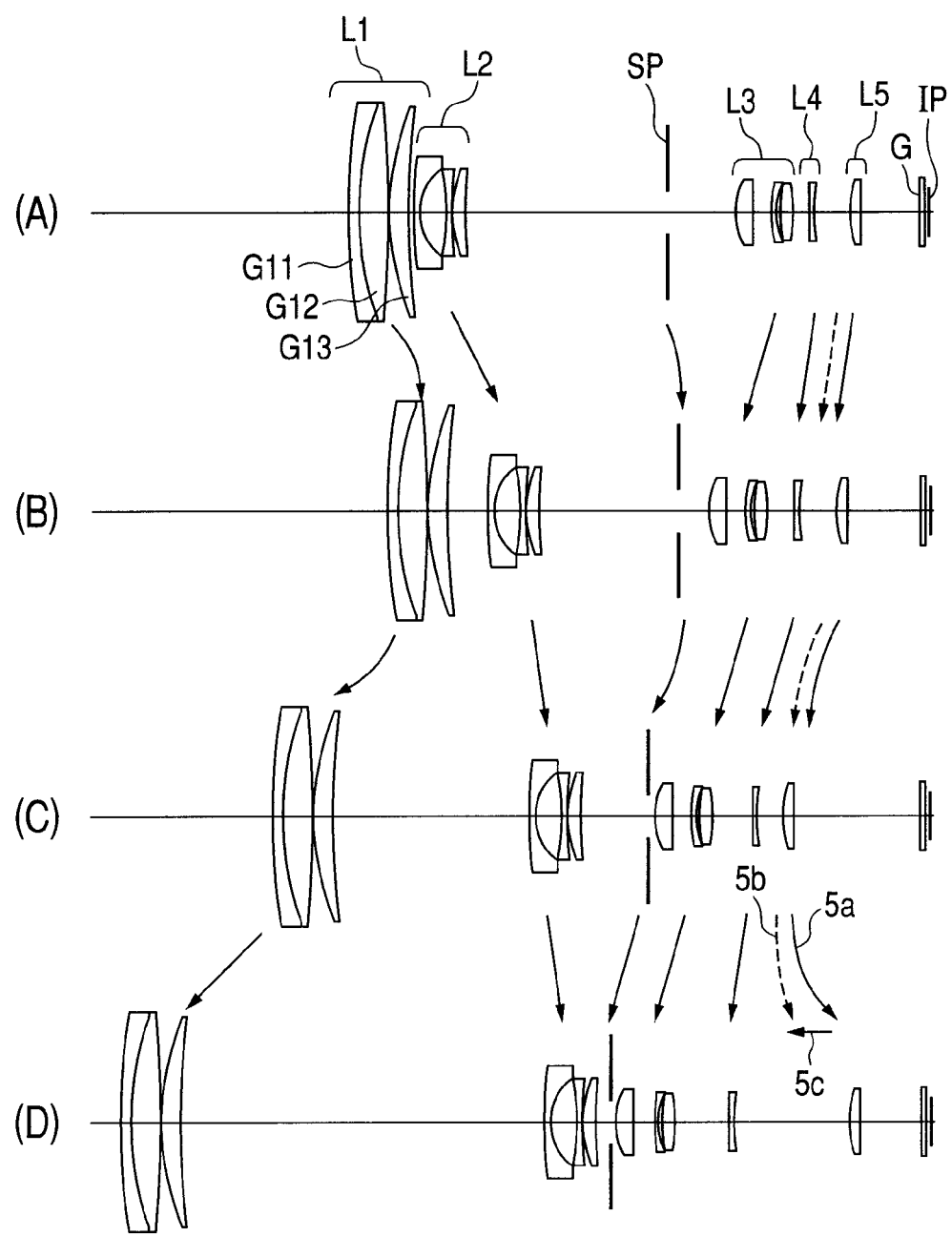
FIG. 1 illustrates lens cross section, and (A), (B), (C) and (D) respectively present states at a wide angle end, at a first intermediate zoom position, at a second intermediate zoom position, and at a telephoto end, respectively, according to a first embodiment of the present invention.
Figure 2A:
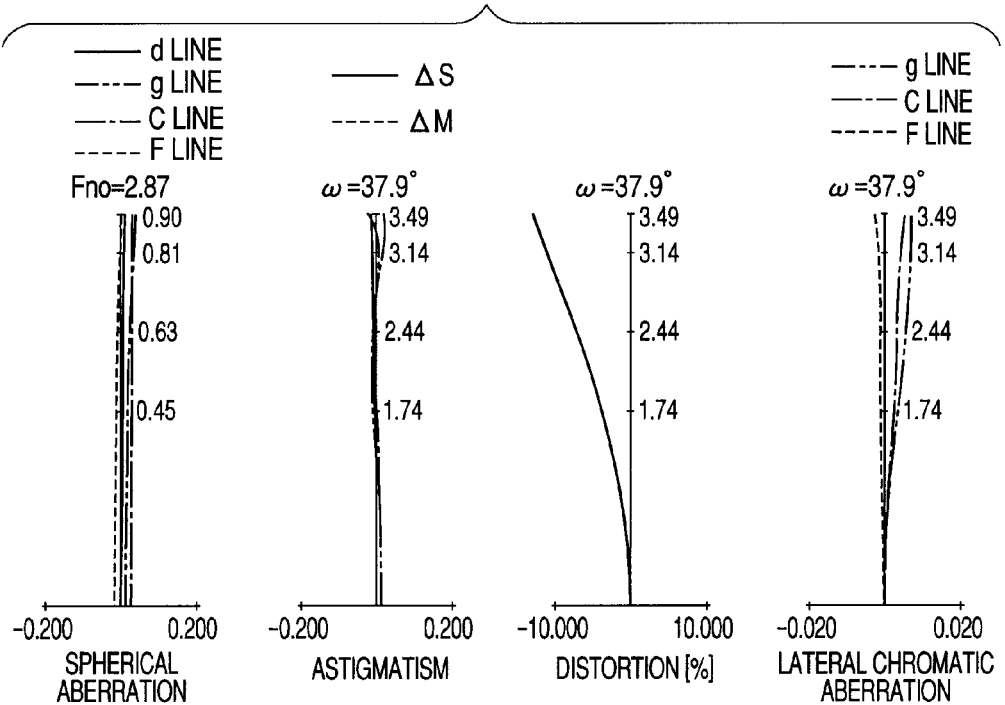
FIGS. 2A, 2B, 2C, and 2D are aberration diagrams at the wide angle end, at the first intermediate zoom position, at the second intermediate zoom position, and at the telephoto end, respectively, according to the first embodiment of the present invention.
Figure 2B:
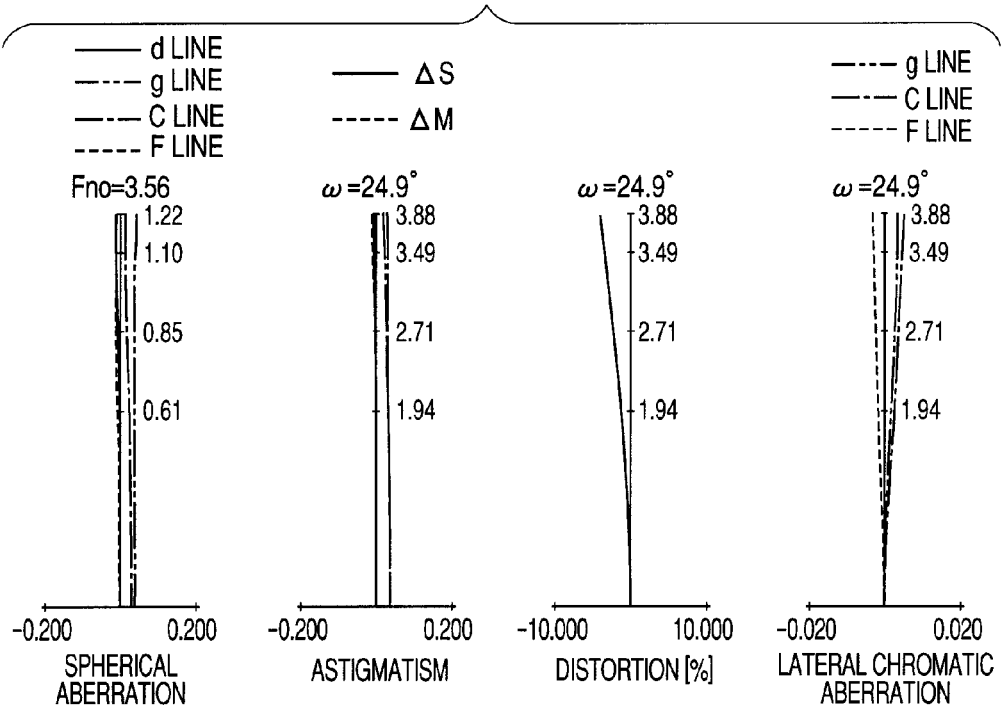
Figure 2C:
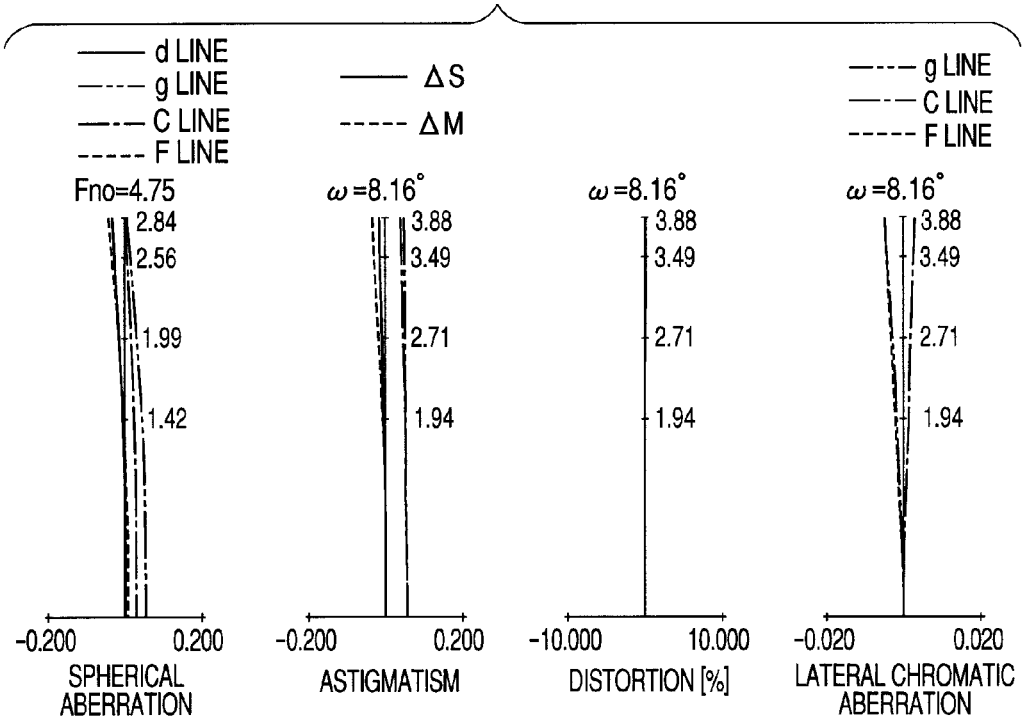
Figure 2D:
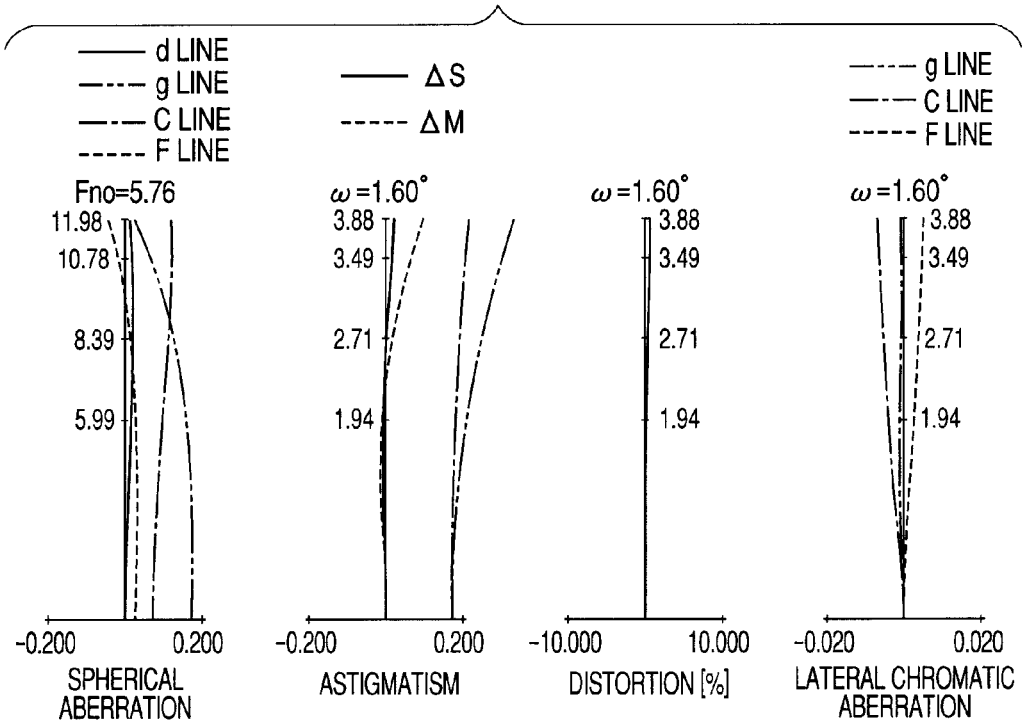
Figure 5:
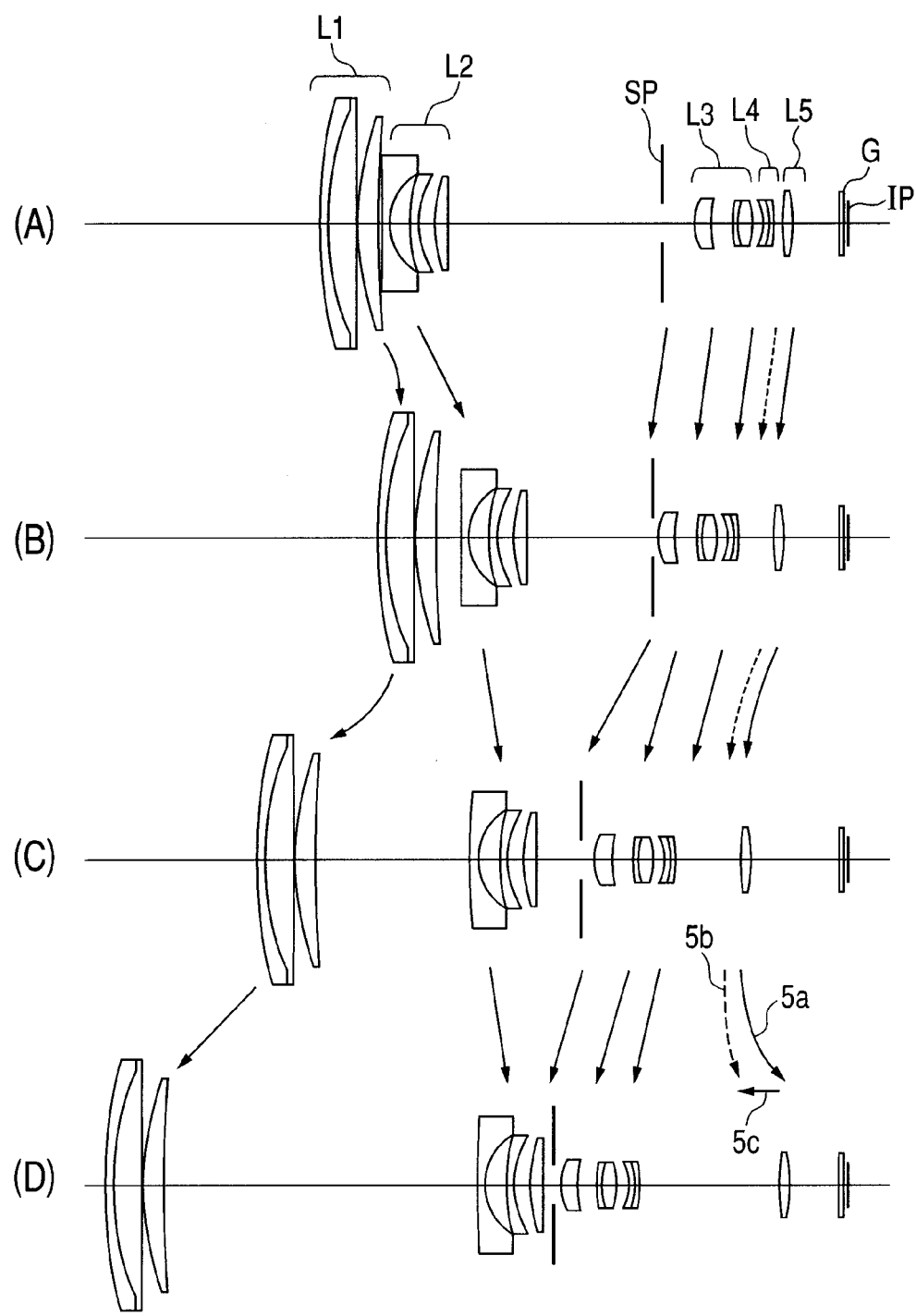
FIG. 5 illustrates lens cross section, and (A), (B), (C) and (D) respectively present states at a wide angle end, at a first intermediate zoom position, at a second intermediate zoom position, and at a telephoto end, respectively, according to a third embodiment of the present invention.
Figure 6A:
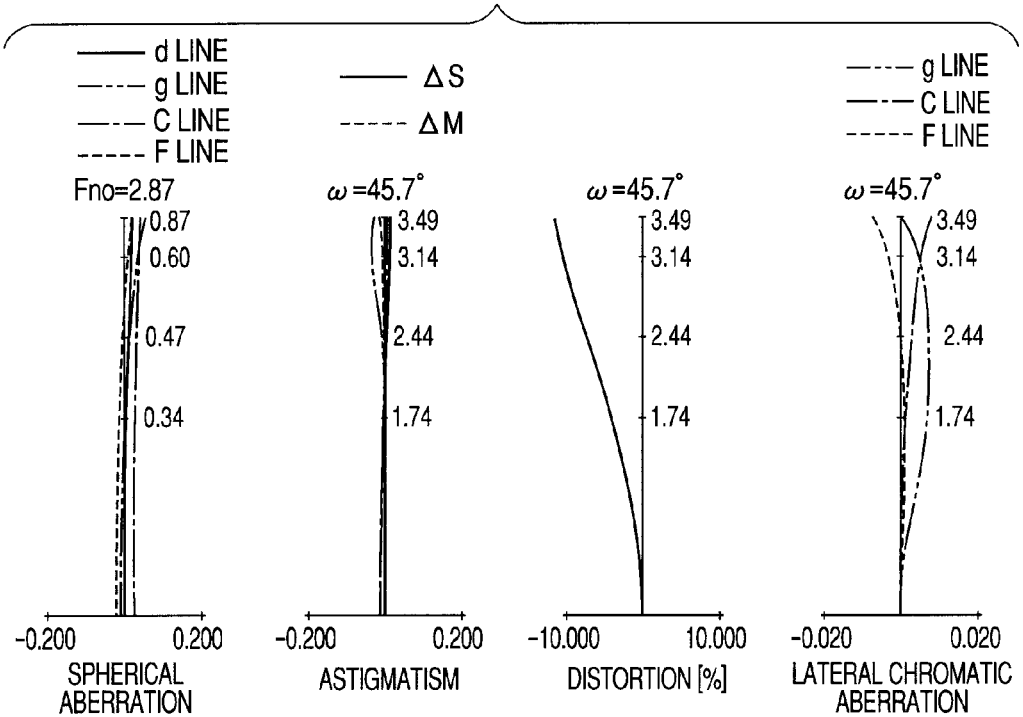
FIGS. 6A, 6B, 6C, and 6D are aberration diagrams at the wide angle end, at the first intermediate zoom position, at the second intermediate zoom position, and at the telephoto end, respectively, according to the third embodiment of the present invention.
Figure 6B:
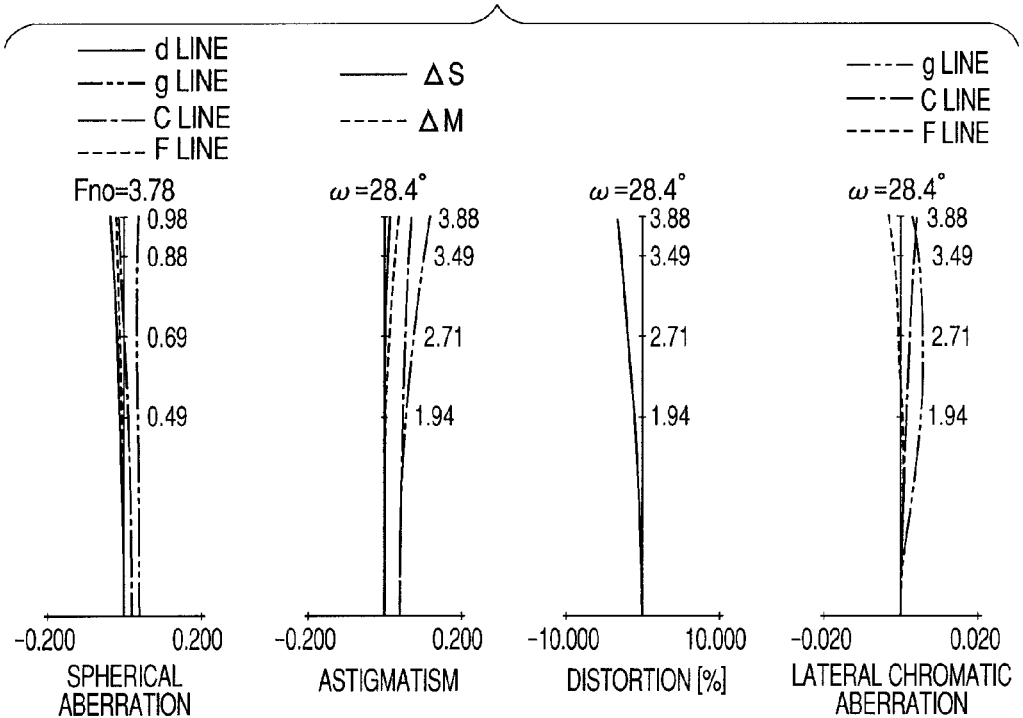
Figure 6C:
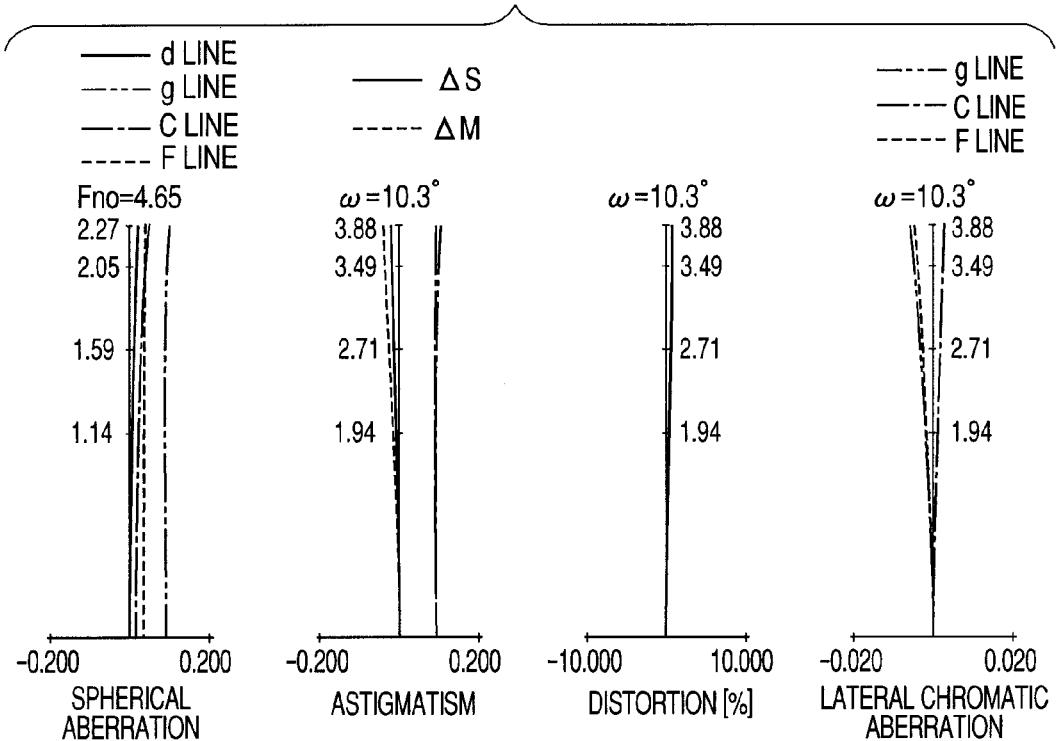
Figure 6D:
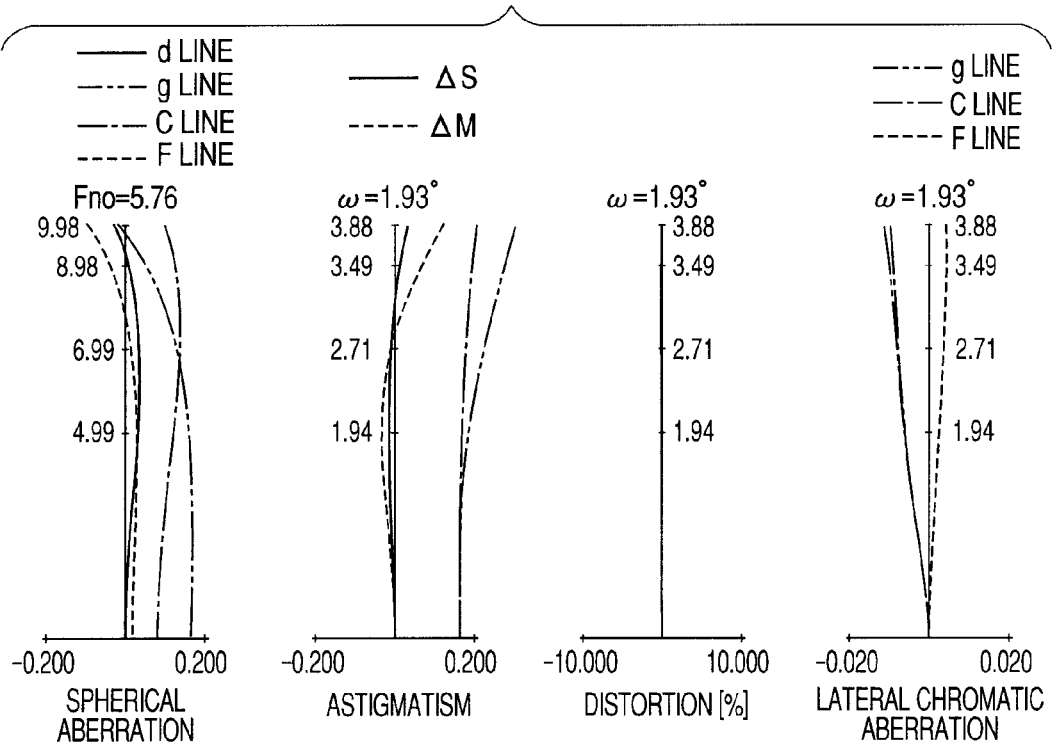

(A) to (D) in FIG. 1 illustrate lens cross sections at a wide angle end (short focal length end), at a first intermediate zoom position, at a second intermediate zoom position, and at a telephoto end (long focal length end), respectively of a zoom lens according to a first embodiment of the present invention. FIGS. 2A, 2B, 2C, and 2D are aberration diagrams at the wide angle end, at the first intermediate zoom position, at the second intermediate zoom position, and at the telephoto end, respectively of the zoom lens according to the first embodiment. FIGS. 3A, 3B, 3C, and 3D illustrate lens cross sections at a wide angle end, at a first intermediate zoom position, at a second intermediate zoom position, and at a telephoto end, respectively of a zoom lens according to a second embodiment of the present invention. FIGS. 4A, 4B, 4C, and 4D are aberration diagrams at the wide angle end, at the first intermediate zoom position, at the second intermediate zoom position, and at the telephoto end, respectively of the zoom lens according to the second embodiment. (A) to (D) in FIG. 5 illustrate lens cross sections at a wide angle end, at a first intermediate zoom position, at a second intermediate zoom position, and at a telephoto end, respectively of a zoom lens according to a third embodiment of the present invention.

Figure 7:
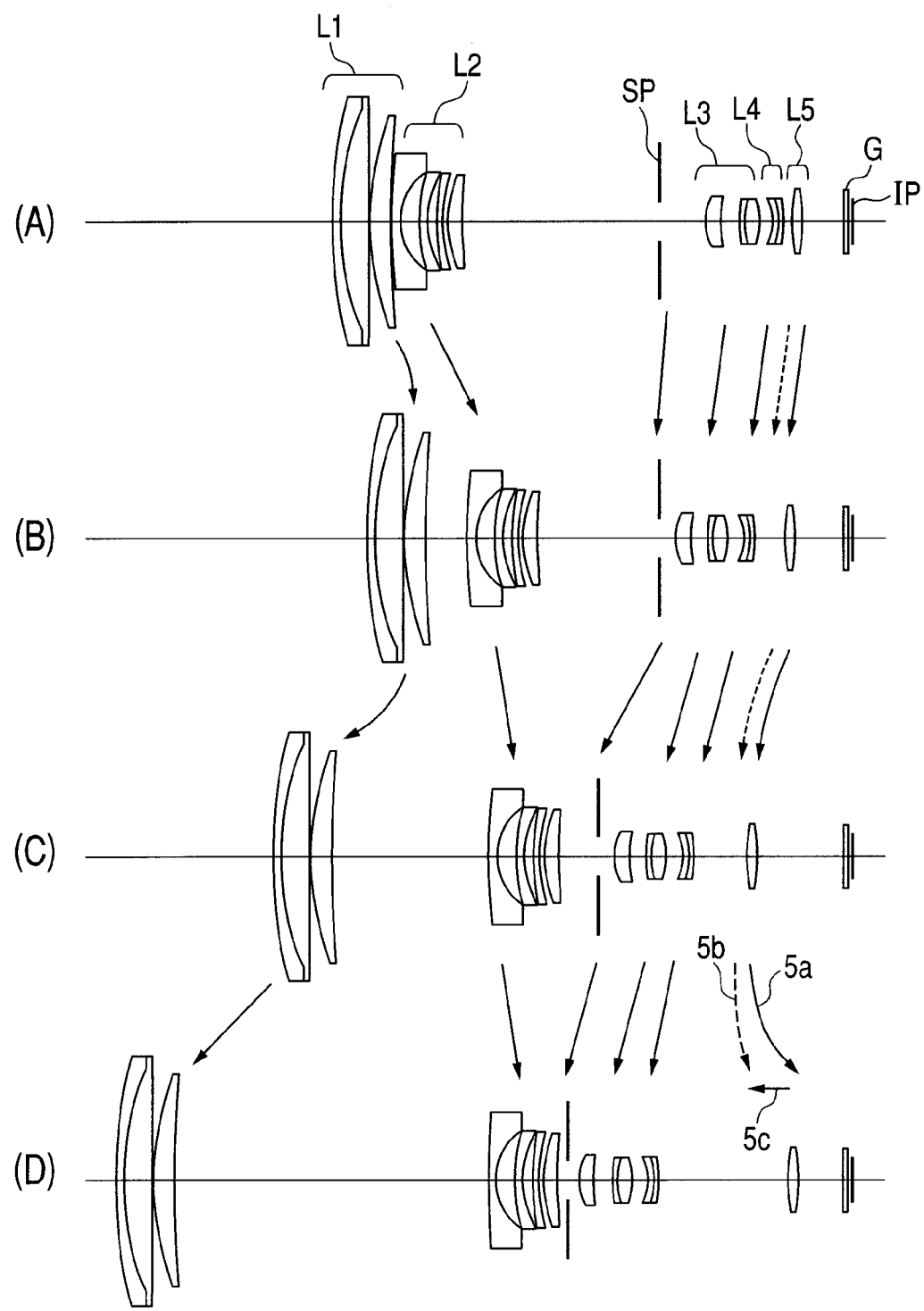
FIG. 7 illustrates lens cross section, and (A), (B), (C) and (D) respectively present states at a wide angle end, at a first intermediate zoom position, at a second intermediate zoom position, and at a telephoto end, respectively, according to a fourth embodiment of the present invention.
Figure 8A:
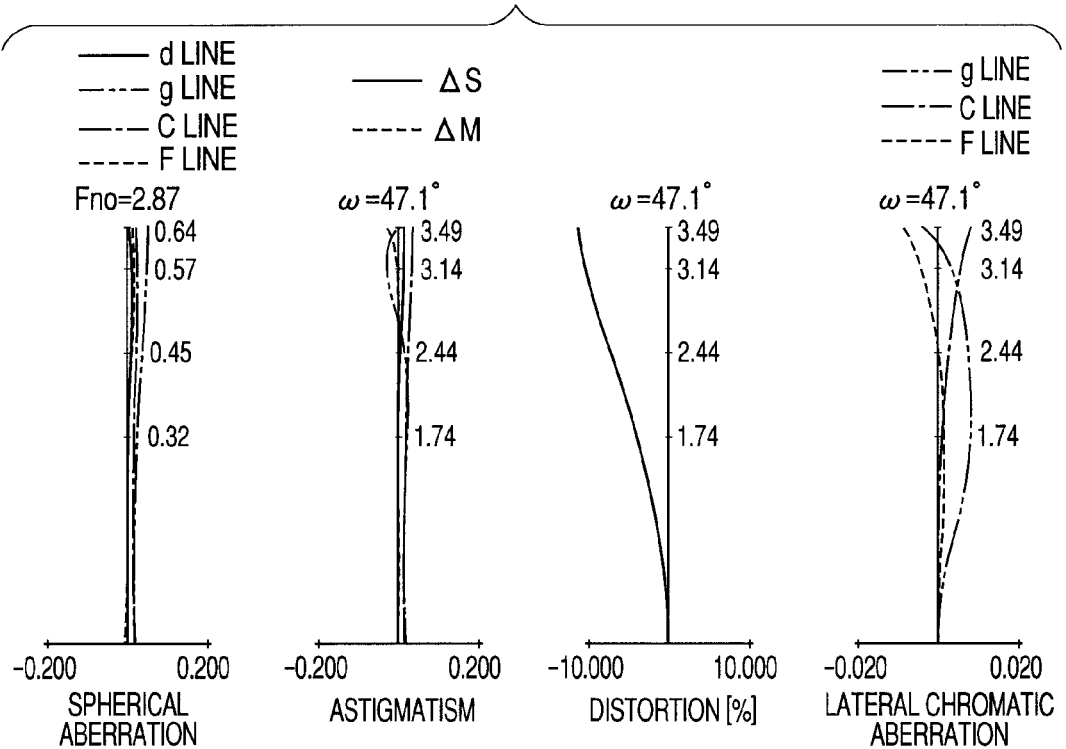
FIGS. 8A, 8B, 8C, and 8D are aberration diagrams at the wide angle end, at the first intermediate zoom position, at the second intermediate zoom position, and at the telephoto end, respectively, according to the fourth embodiment of the present invention.
Figure 8B:
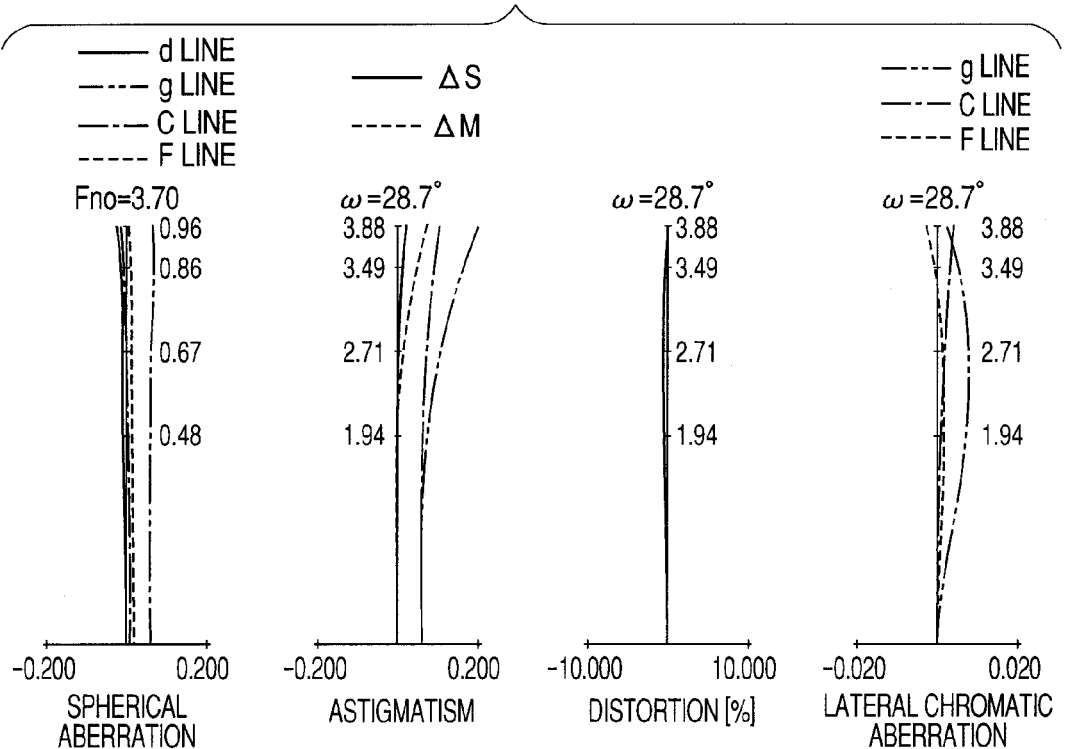
Figure 8C:
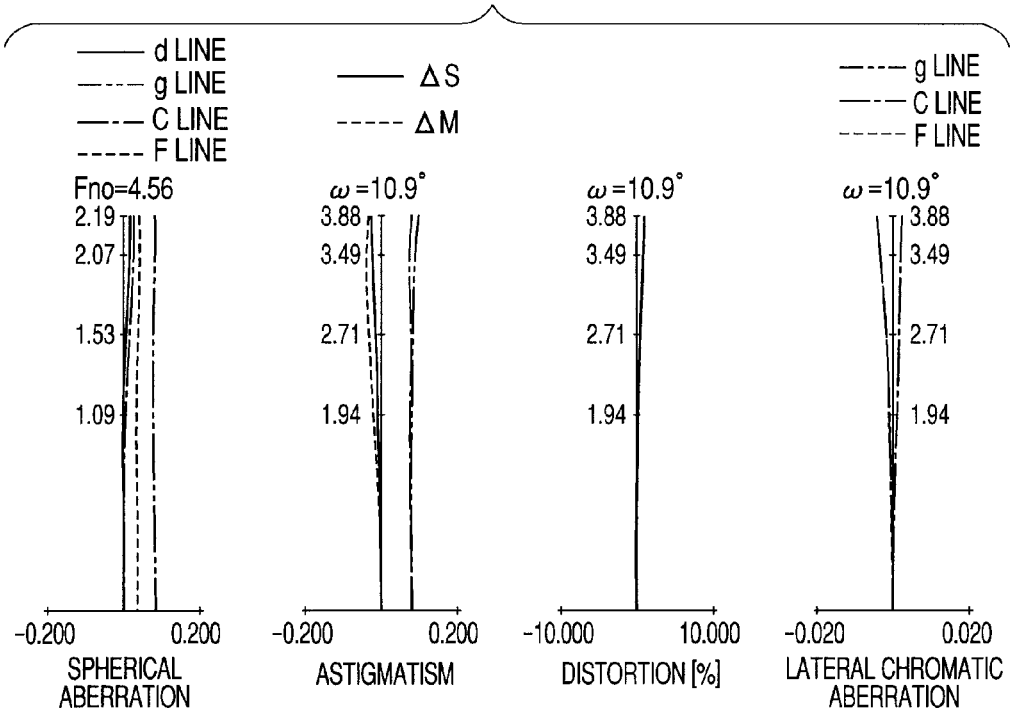
Figure 8D:
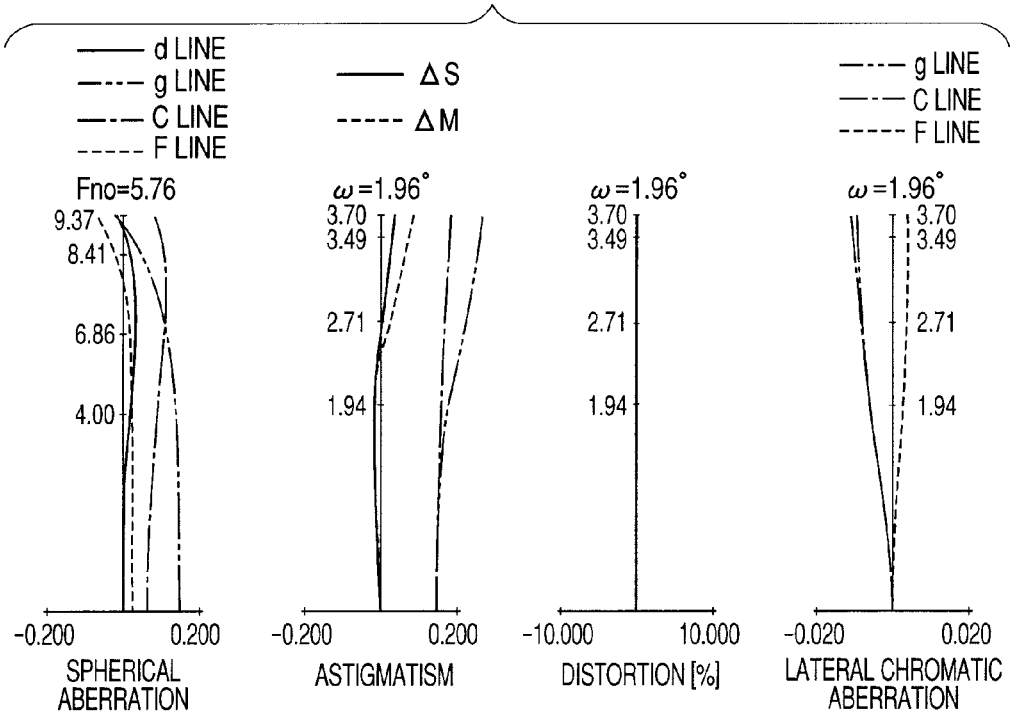
Figure 9:
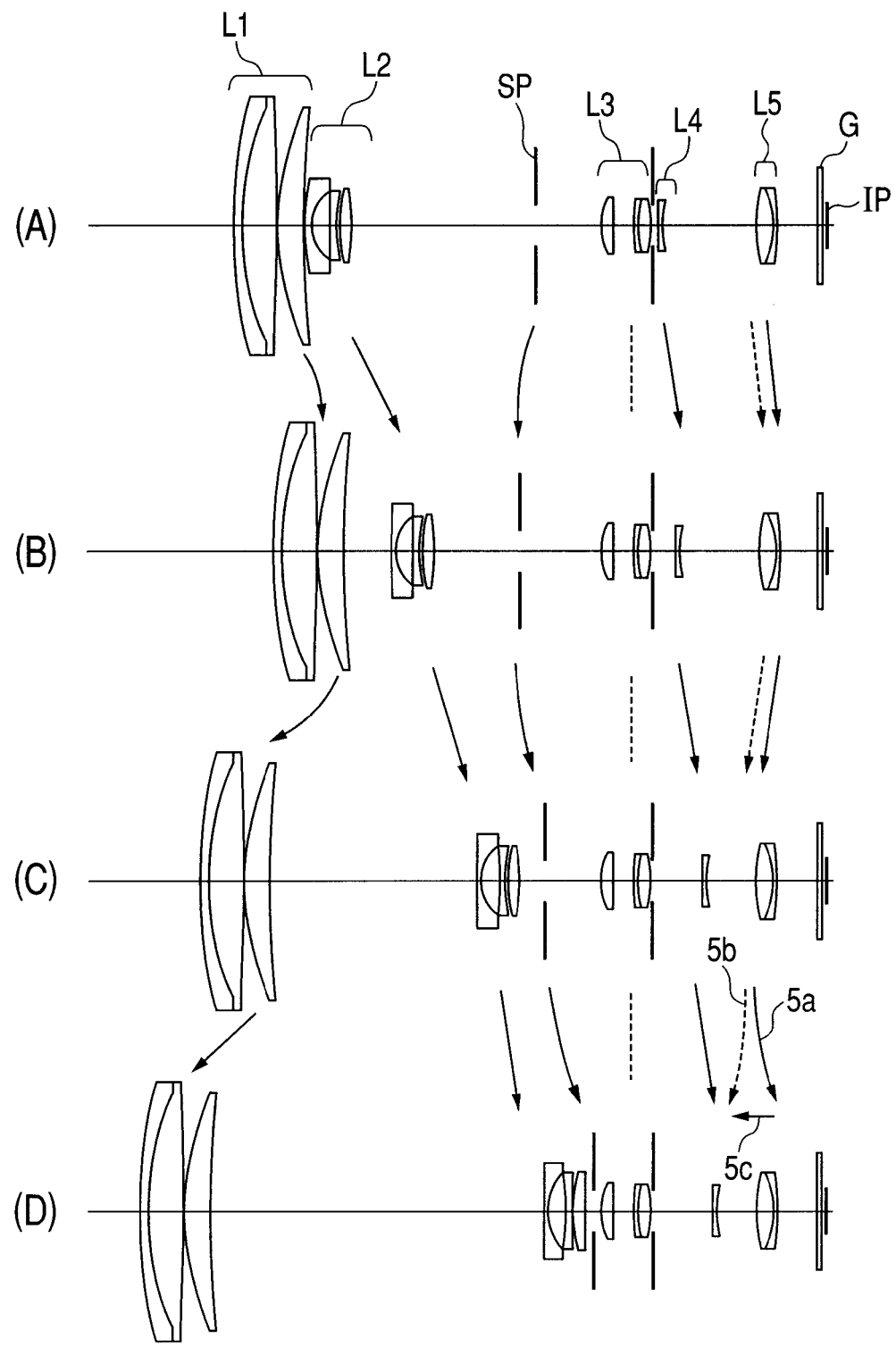
FIG. 9 illustrates lens cross section, and (A), (B), (C) and (D) respectively present states at a wide angle end, at a first intermediate zoom position, at a second intermediate zoom position, and at a telephoto end, respectively, according to a fifth embodiment of the present invention.
Figure 10A:
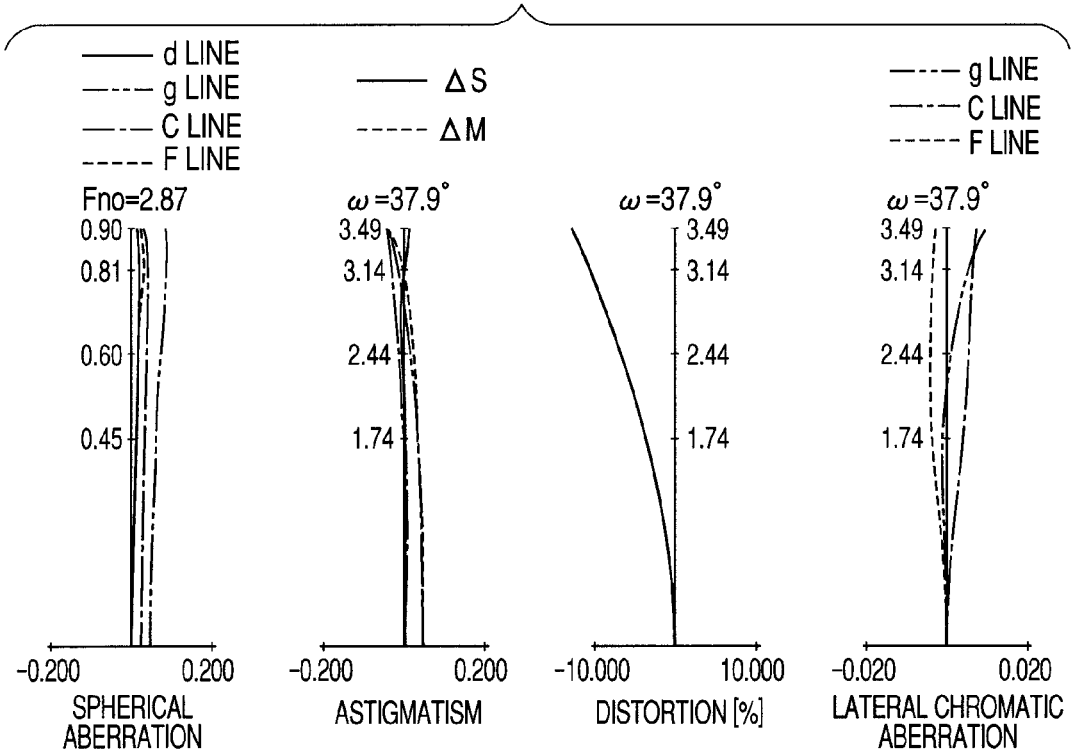
FIGS. 10A, 10B, 10C, and 10D are aberration diagrams at the wide angle end, at the first intermediate zoom position, at the second intermediate zoom position, and at the telephoto end, respectively, according to the fifth embodiment of the present invention.
Figure 10B:
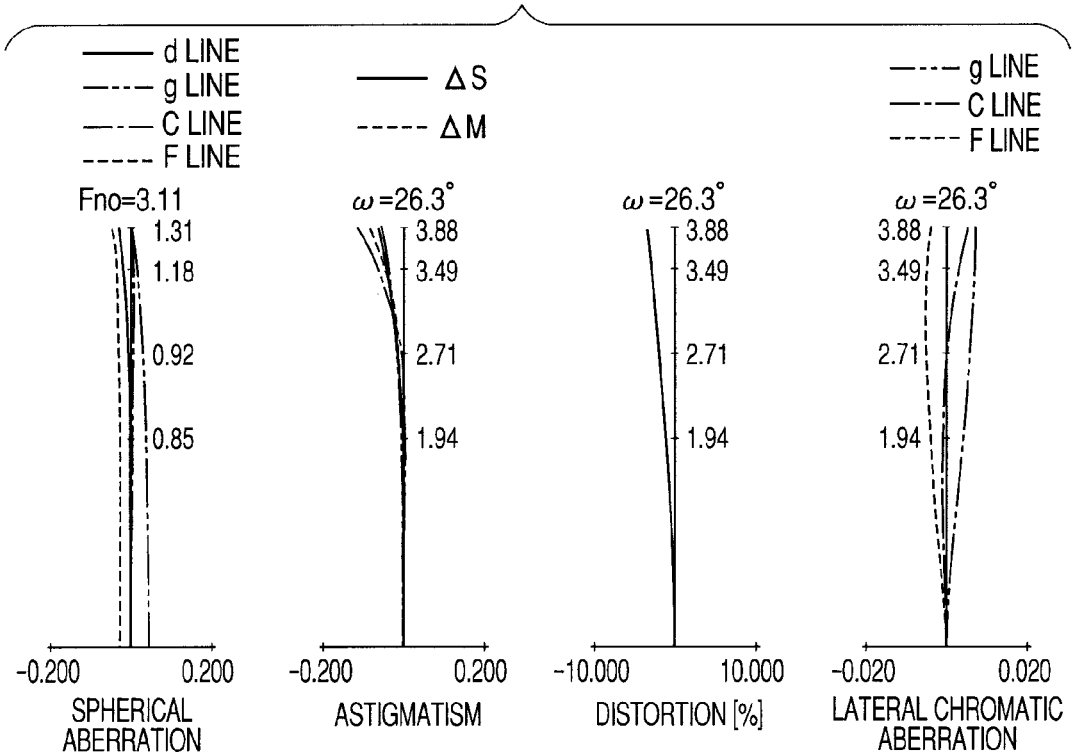
Figure 10C:
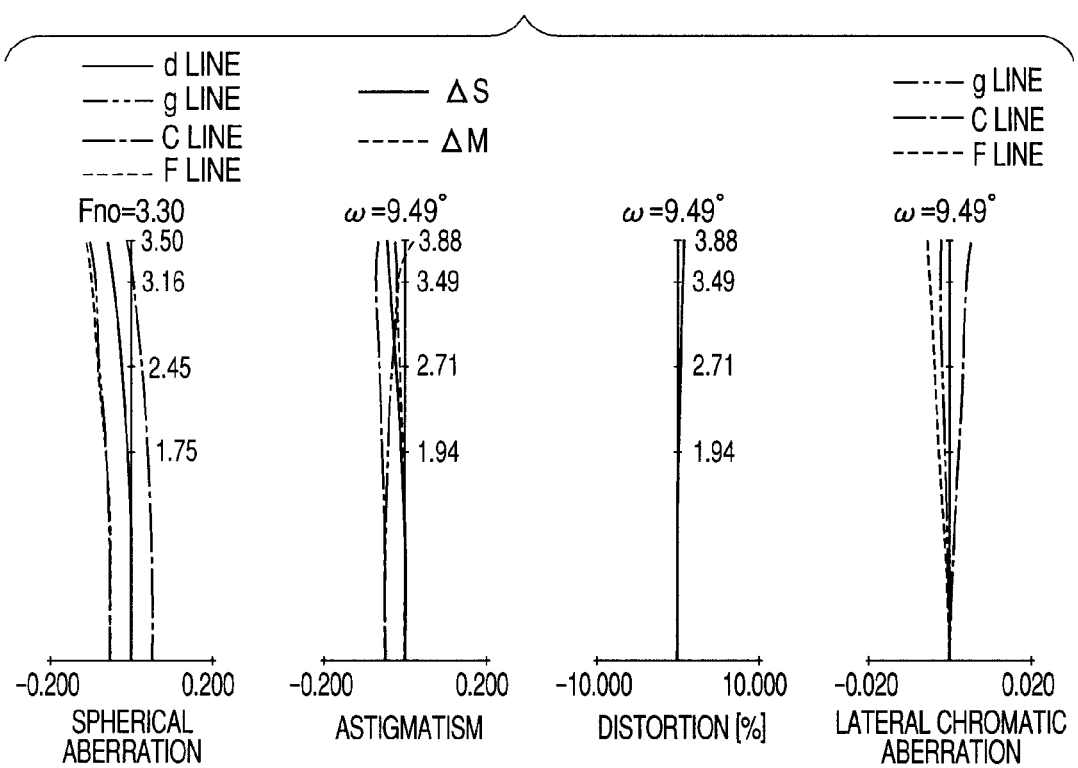
Figure 10D:
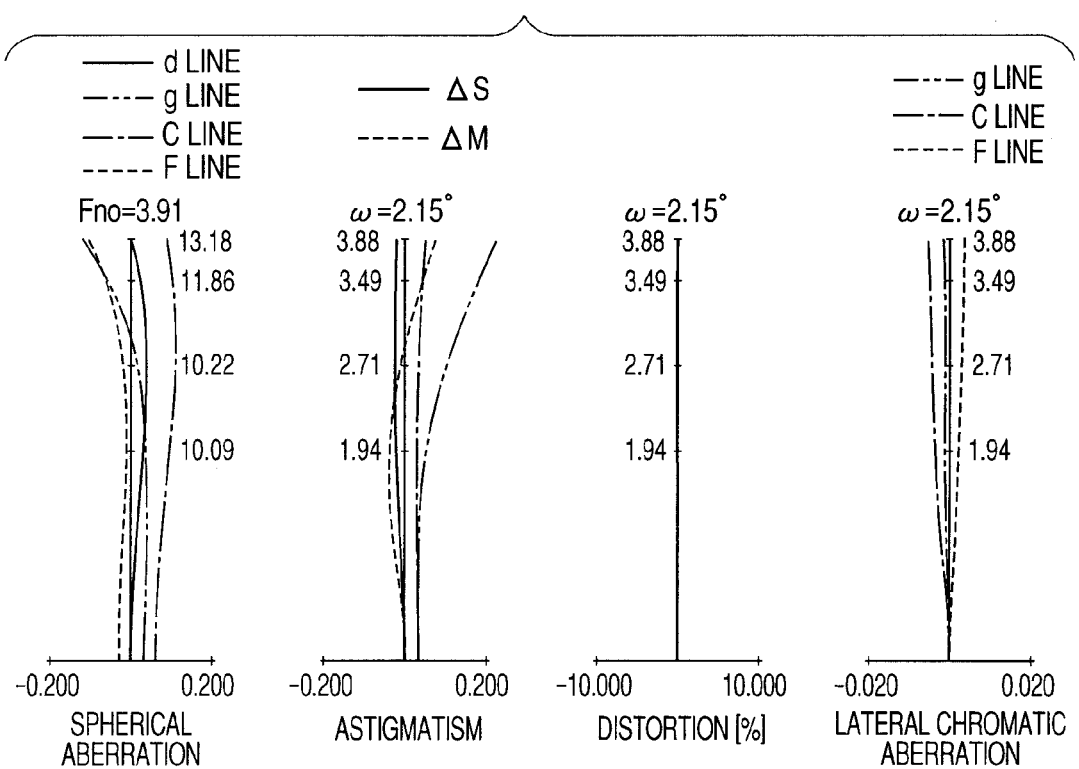
Figure 11:
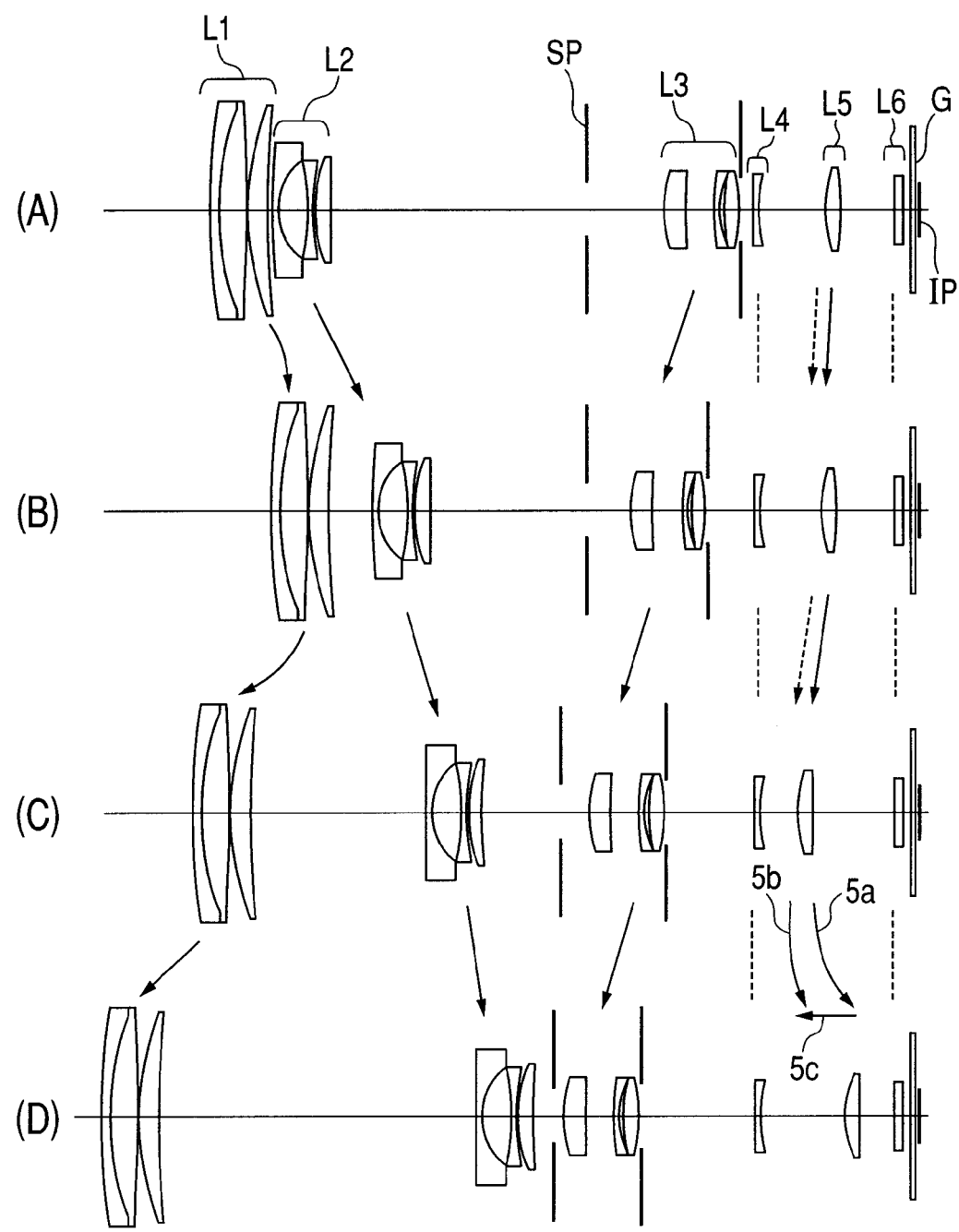
FIG. 11 illustrates lens cross section, and (A), (B), (C) and (D) respectively present states at a wide angle end, at a first intermediate zoom position, at a second intermediate zoom position, and at a telephoto end, respectively, according to a sixth embodiment of the present invention.
Figure 12A:
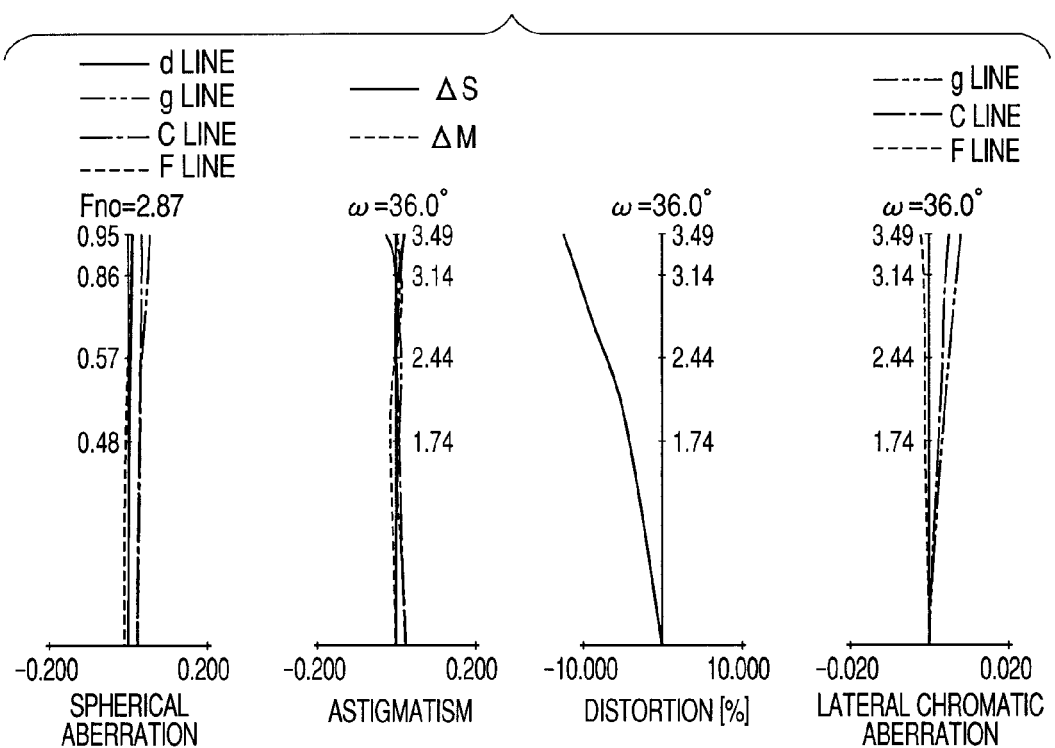
FIGS. 12A, 12B, 12C, and 12D are aberration diagrams at the wide angle end, at the first intermediate zoom position, at the second intermediate zoom position, and at the telephoto end, respectively, according to the sixth embodiment of the present invention.
Figure 12B:
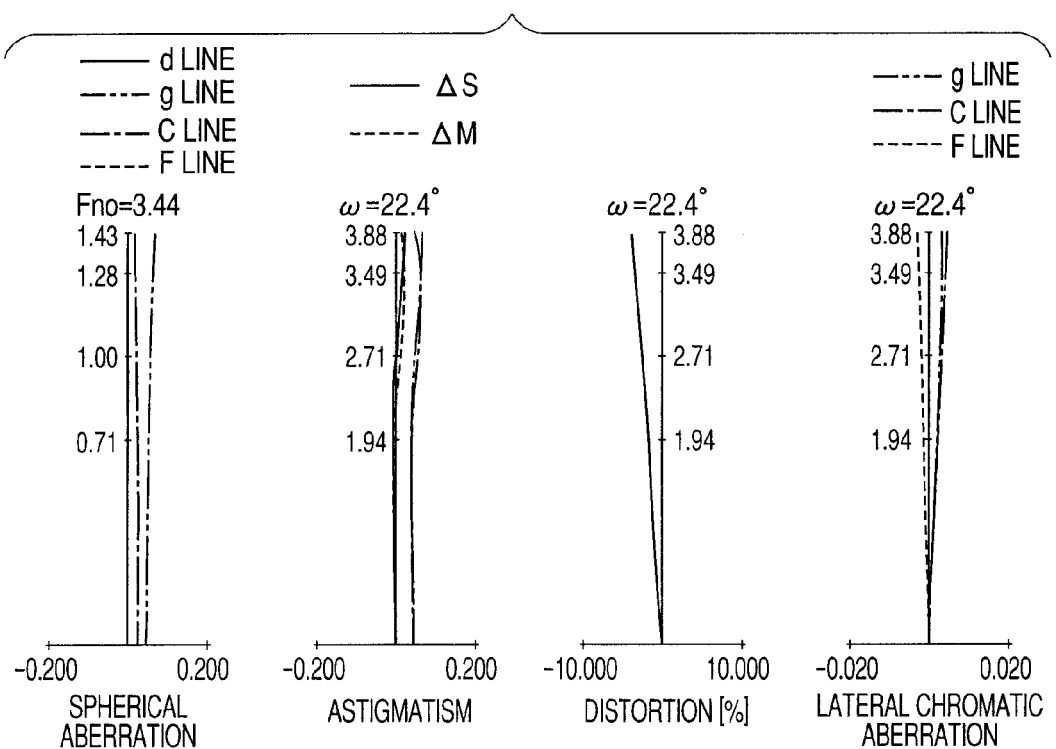
Figure 12C:
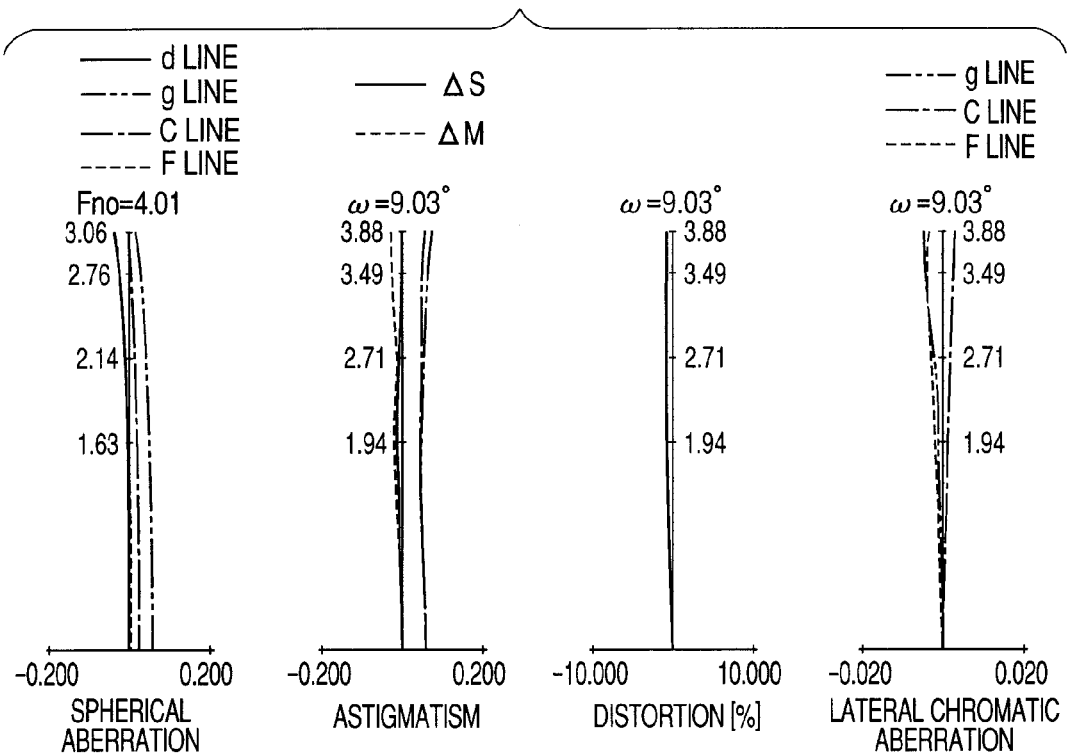
Figure 12D:
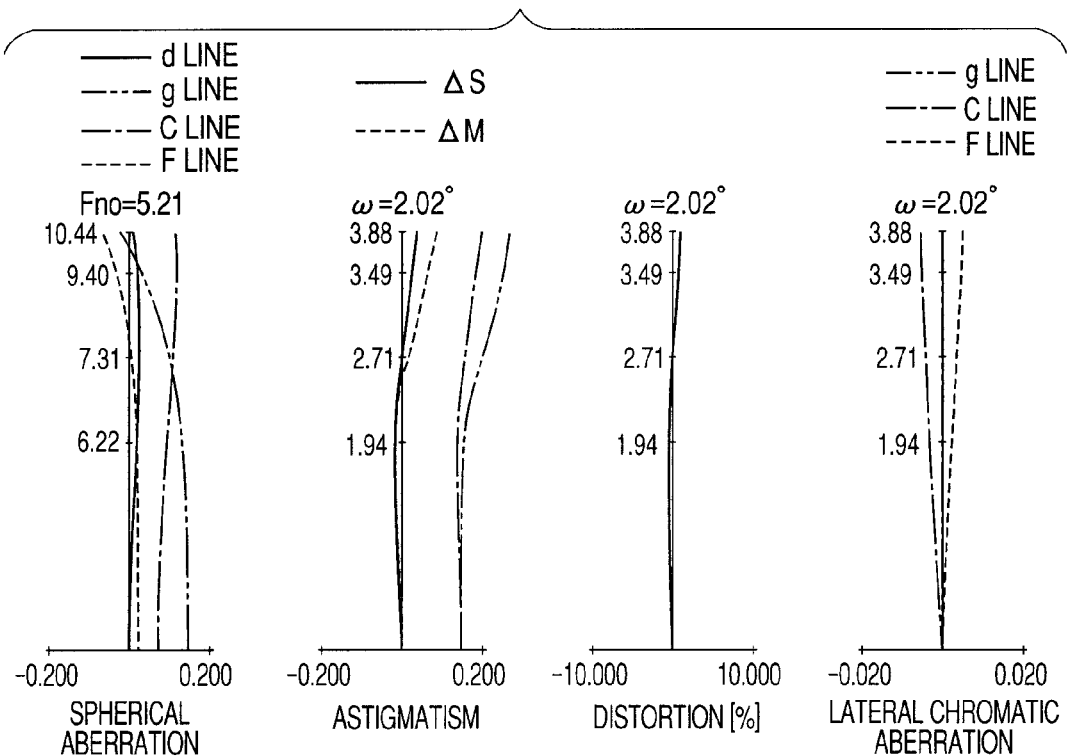

FIGS. 6A, 6B, 6C, and 6D are aberration diagrams at the wide angle end, at the first intermediate zoom position, at the second intermediate zoom position, and at the telephoto end, respectively of the zoom lens according to the third embodiment. (A) to (D) in FIG. 7 illustrate lens cross sections at a wide angle end, at a first intermediate zoom position, at a second intermediate zoom position, and at a telephoto end, respectively of a zoom lens according to a fourth embodiment of the present invention. FIGS. 8A, 8B, 8C, and 8D are aberration diagrams at the wide angle end, at the first intermediate zoom position, at the second intermediate zoom position, and at the telephoto end, respectively of the zoom lens according to the fourth embodiment. (A) to (D) in FIG. 9 illustrate lens cross sections at a wide angle end, at a first intermediate zoom position, at a second intermediate zoom position, and at a telephoto end, respectively of a zoom lens according to a fifth embodiment of the present invention. FIGS. 10A, 10B, 10C, and 10D are aberration diagrams at the wide angle end, at the first intermediate zoom position, at the second intermediate zoom position, and at the telephoto end, respectively of the zoom lens according to the fifth embodiment. (A) to (D) in FIG. 11 illustrate lens cross sections at a wide angle end, at a first intermediate zoom position, at a second intermediate zoom position, and at a telephoto end, respectively of a zoom lens according to a sixth embodiment of the present invention. FIGS. 12A, 12B, 12C, and 12D are aberration diagrams at the wide angle end, at the first intermediate zoom position, at the second intermediate zoom position, and at the telephoto end, respectively of the zoom lens according to the sixth embodiment.

Figure 13:
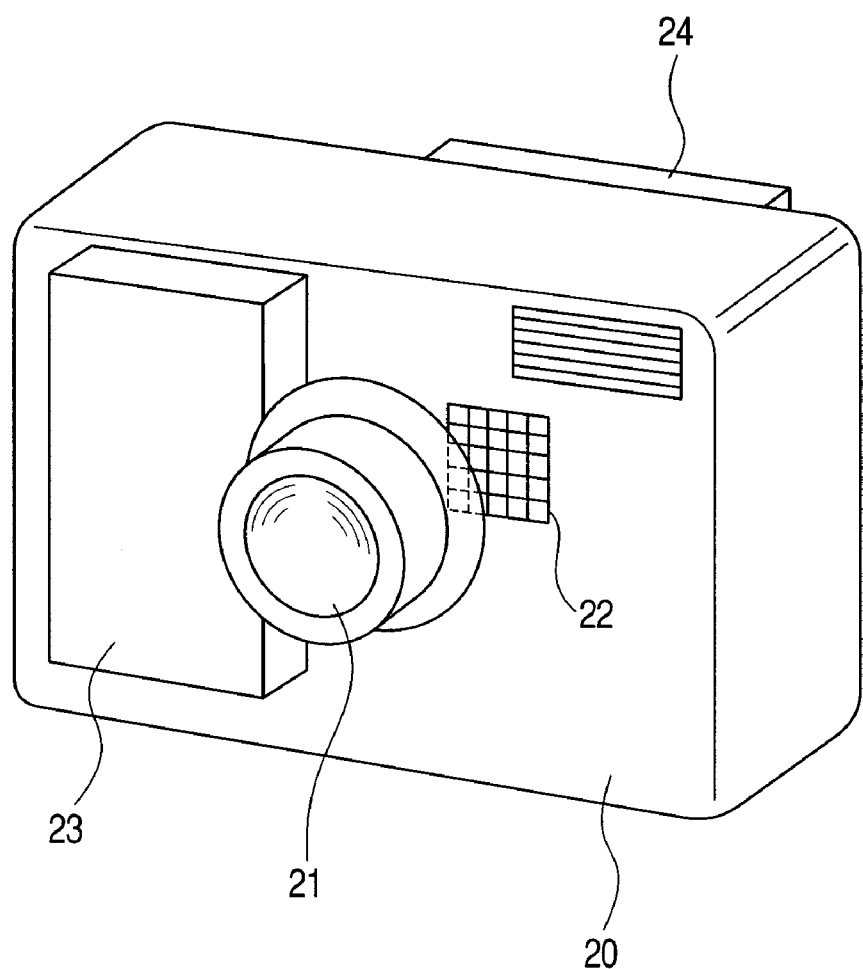
FIG. 13 is a schematic view illustrating a main portion when the zoom lens of the present invention is applied to a digital camera.

FIG. 13 is a schematic view illustrating a main portion of a camera (image pickup apparatus) including the zoom lens of the present invention. The zoom lens of each embodiment is a taking lens system that is used for an image pickup apparatus such as a video camera, a digital camera, and a silver-halide film camera. In the lens cross sections, the left side corresponds to a subject side (object side) (front side), while the right side corresponds to an image side (rear side). In the lens cross sections, i indicates an order of the lens unit from the object side, and Li represents an i-th lens unit.

In the lens cross sections of the first, third, fourth, and fifth embodiments illustrated in FIGS. 1, 5, 7, and 9, respectively, the zoom lens includes a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. Each of those embodiments describes a positive-lead type five-unit zoom lens.

Figure 3:
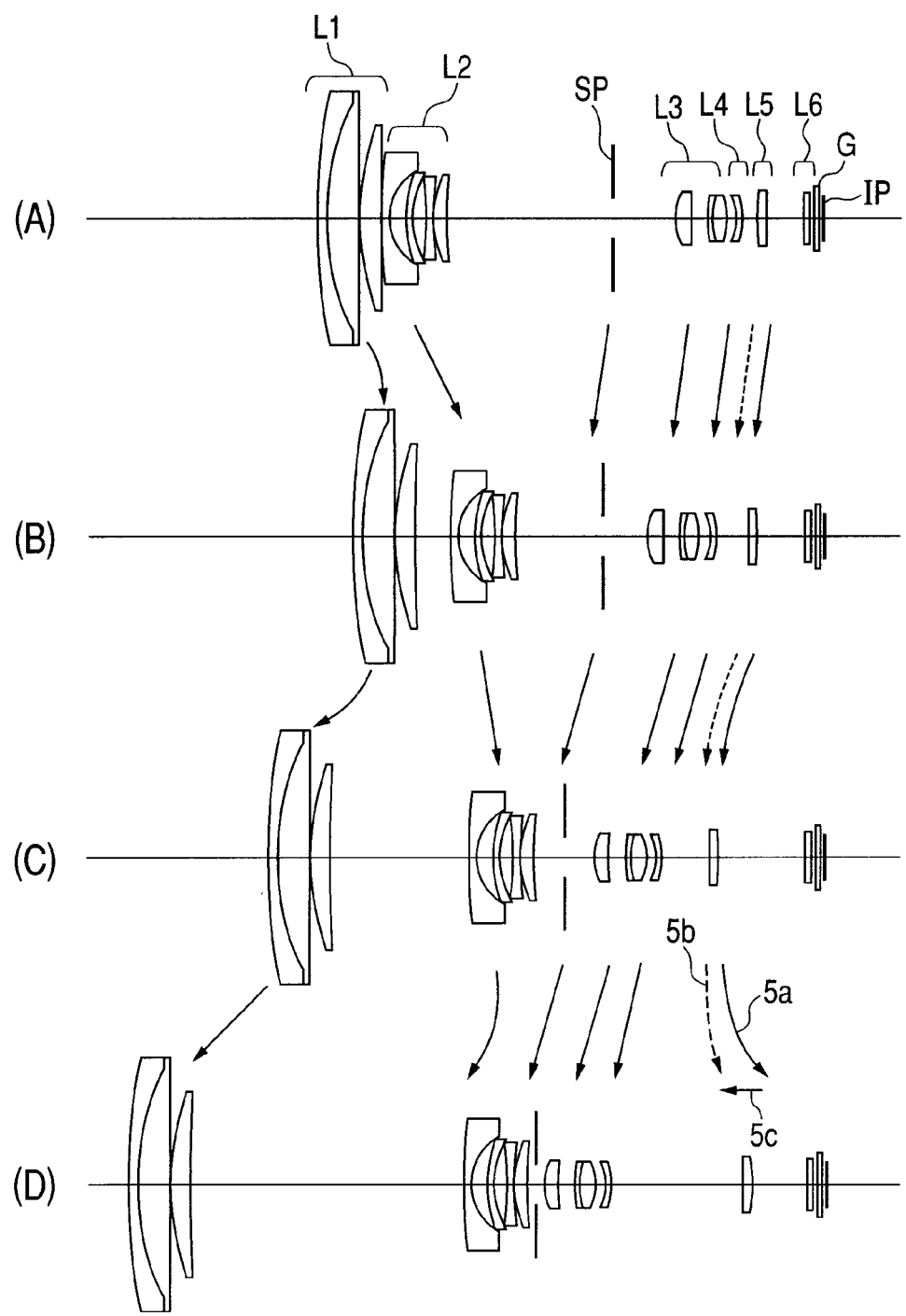
FIG. 3 illustrates lens cross section, and (A), (B), (C) and (D) respectively presents states at a wide angle end, at a first intermediate zoom position, at a second intermediate zoom position, and at a telephoto end, respectively, according to a second embodiment of the present invention.
Figure 4A:
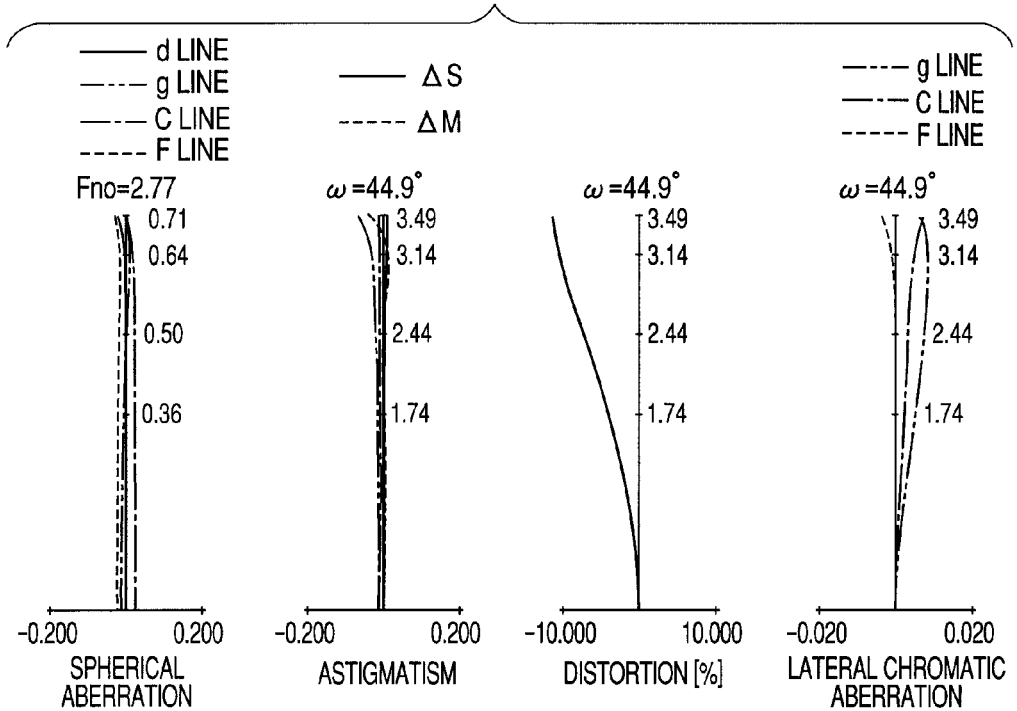
FIGS. 4A, 4B, 4C, and 4D are aberration diagrams at the wide angle end, at the first intermediate zoom position, at the second intermediate zoom position, and at the telephoto end, respectively, according to the second embodiment of the present invention.
Figure 4B:
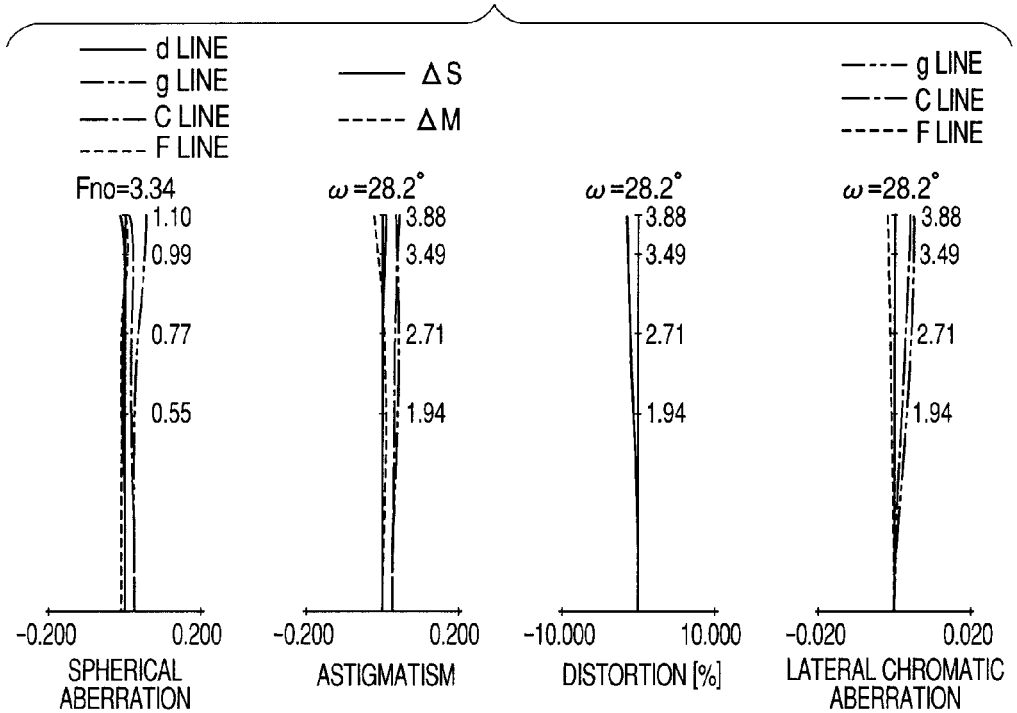
Figure 4C:
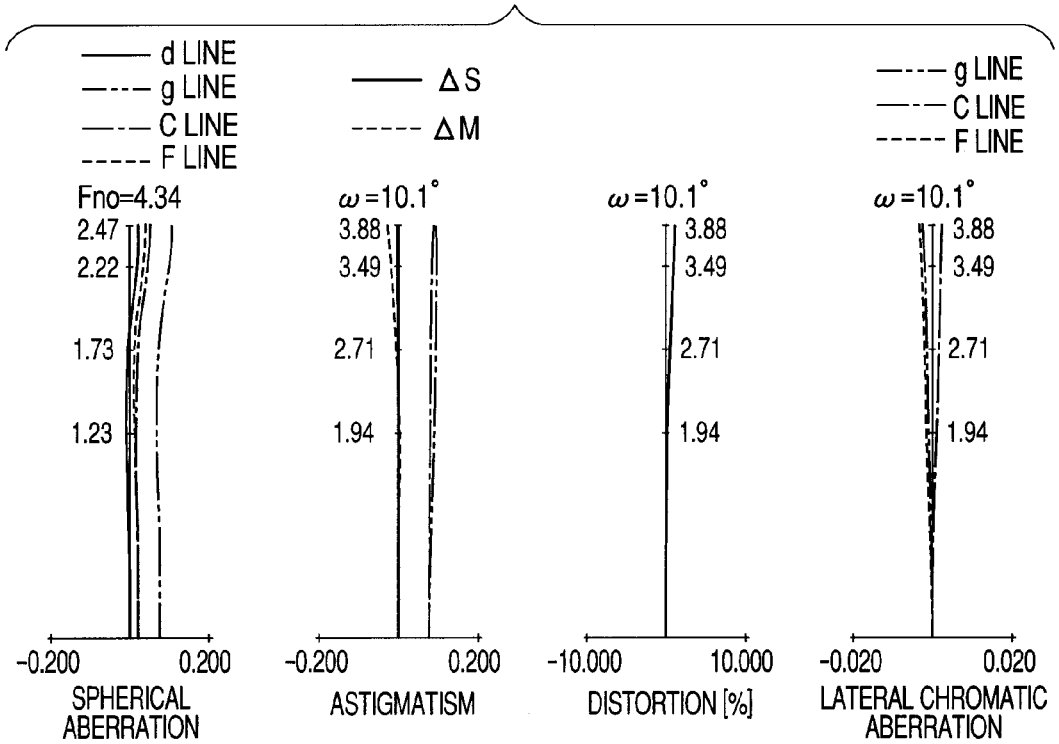
Figure 4D:
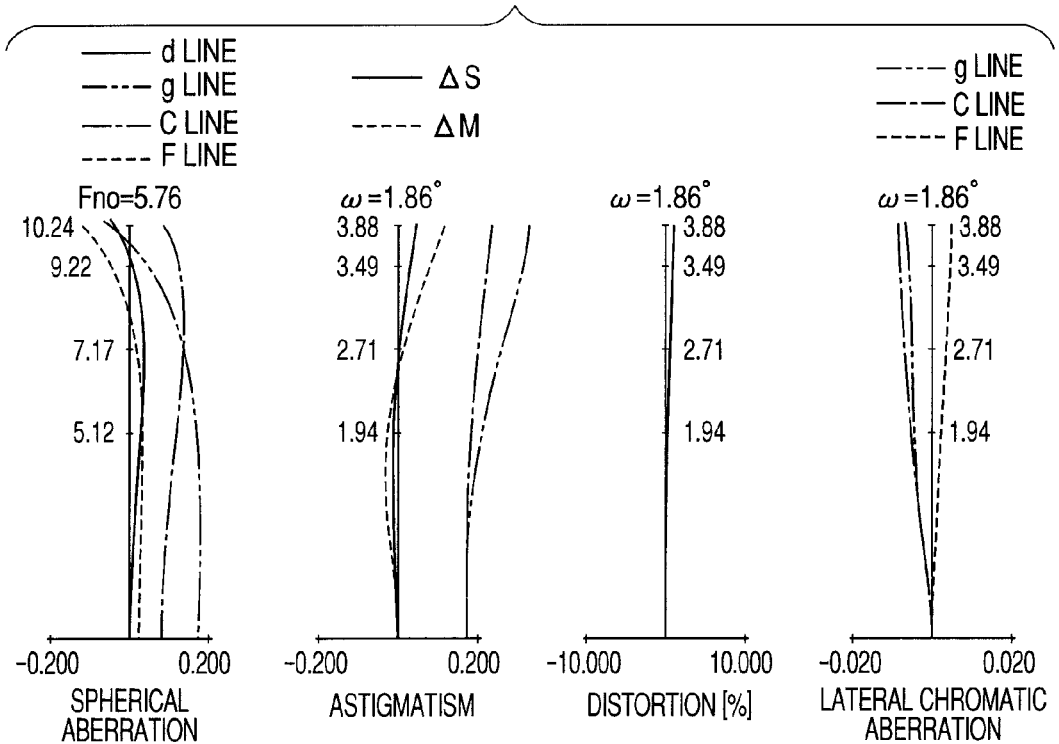

In the lens cross sections of the second embodiment illustrated in FIG. 3, the zoom lens includes a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having positive refractive power. The second embodiment describes a positive-lead type six-unit zoom lens. In the lens cross sections of the sixth embodiment illustrated in FIG. 11, the zoom lens includes a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having negative refractive power. The sixth embodiment describes a positive-lead type six-unit zoom lens.

In each embodiment, an aperture stop SP is disposed on the object side of the third lens unit L3. An optical block G corresponds to an optical filter, a face plate, a crystal low-pass filter, an infrared cut filter, or the like. As an image plane IP, a photosensitive surface corresponding to an imaging plane of a solid-state image pickup element (photoelectric transducer element) such as a charge coupled device (CCD) sensor or a complementary metal oxide semiconductor (CMOS) sensor is disposed when the zoom lens is used as a photographing optical system of a video camera or a digital still camera. Alternatively, a photosensitive surface corresponding to the film surface is disposed when the zoom lens is used for a silver-halide film camera. In the aberration diagrams, d, g, C, and F denote a d-line, a g-line, C-line, and F-line, respectively. ΔM and ΔS denote a meridional image plane and a sagittal image plane, respectively. Lateral chromatic aberration is expressed by the g-line, the C-line, and the F-line. Symbol ω denotes a half field angle (half value of an angle of imaging field), and Fno denotes an F-number. Further, in each embodiment described below, the wide angle end and the telephoto end refer to zoom positions when the lens unit for zooming is positioned at each end of a mechanically movable range along an optical axis. In each embodiment, an arrow indicates a movement locus during zooming from the wide angle end to the telephoto end or during focusing.

In each embodiment, at least the first lens unit L1 and the second lens unit L2 move during zooming. In this case, an interval between the first lens unit L1 and the second lens unit L2 increases at the telephoto end compared with the wide angle end so that a zooming ratio of the second lens unit L2 is increased. An interval between the second lens unit L2 and the third lens unit L3 is decreased so that the third lens unit L3 has a zooming effect for reducing variations of spherical aberration and curvature of field due to zooming. Specifically, the first lens unit L1 moves along a locus convex toward the image side during zooming from the wide angle end to the telephoto end as illustrated by the arrow.

Here, the zoom position where the first lens unit L1 is positioned closest to the image plane side during zooming is the first intermediate zoom position. Focal lengths of the entire system at the wide angle end and at the telephoto end are denoted by fw and ft, respectively. In this case, when the focal length of the entire system is denoted by fm2, the zoom position of the focal length fm2 satisfying the following equation is the second intermediate zoom position.

$$fm2=(fw \cdot ft)^{1/2} \quad (A)$$

The second lens unit L2 moves to the image plane side at the telephoto end compared with the wide angle end. The aperture stop SP moves along a locus different from that of the third lens unit L3. The third lens unit L3 moves to the object side or does not move. The fourth lens unit L4 moves monotonously to the object side or to the image plane side, or does not move.

The fifth lens unit L5 moves in a non-linear manner, so as to correct an image plane variation due to zooming. In addition, a rear focus type is adopted in which the fifth lens unit L5 is moved on the optical axis for focusing. In focusing at the telephoto end from an object at infinity to an object at a short distance, the fifth lens unit L5 is brought to the front side as illustrated by the arrow 5c in each lens cross section. The solid line curve 5a and the dotted line curve 5b concerning the fifth lens unit L5 indicate a movement locus for correcting the image plane variation due to zooming from the wide angle end to the telephoto end when the object at infinity or the object at a short distance is focused, respectively. Note that, focusing may be performed by moving the fourth lens unit L4.

In the second and sixth embodiments illustrated in FIGS. 3 and 11, the sixth lens unit L6 does not move for zooming. In order to obtain a high zoom ratio in the five-unit zoom lens, it is better to set large movement amounts during zooming of the second lens unit L2 and the third lens unit L3 having large zooming actions. With this method, however, an interval between the second lens unit L2 and the third lens unit L3 increases at the wide angle end. Therefore, if the aperture stop SP is integrated with the third lens unit L3, an interval between the front lens (first lens unit L1) and the aperture stop SP increases at the wide angle end, and hence lenses constituting the first lens unit L1 become large. In order to avoid this, the aperture stop SP is moved independently of other lens units so that the interval between the aperture stop SP and the third lens unit L3 becomes small at the telephoto end compared with the wide angle end. Because the aperture stop SP is disposed with an interval closer to the object side than the third lens unit L3 in the range from the wide angle end to the intermediate zoom range, an entrance pupil distance is decreased compared with the case where the aperture stop SP is disposed in the vicinity of the third lens unit L3 so that they are moved as one unit. Therefore, an incident height of an off-axial light beam passing through the first lens unit L1 and the second lens unit L2 can be decreased. Thus, it is possible to obtain an effect that an effective diameter and a thickness of a lens constituting the lens unit are reduced. In addition, if the aperture stop SP is moved integrally with the third lens unit L3, peripheral light amount is decreased steeply on the periphery of the screen in order to secure sufficient light amount on the periphery of the screen in the range from the wide angle end to the intermediate zoom range.

On the other hand, if the aperture stop SP is moved by an appropriate amount from the third lens unit L3 to the object side in the range from the wide angle end to the intermediate zoom range, an aperture stop diameter can be reduced because an axial light flux is diverging. By reducing the aperture stop diameter and by disposing the aperture stop SP on the object side, it is possible to cut off a part of the off-axial light beam reaching a low image height in a peripheral field angle. Thus, decrease of light amount on the periphery of the screen can be mild, and hence decrease in the peripheral light amount is not conspicuous. In addition, because the aperture stop is disposed closer to the object side than the third lens unit L3 in the intermediate zoom range, a flare component of the off-axial light beam can be cut off. Note that, the aperture stop diameter may be fixed or variable at each zoom position. It is preferred that the aperture stop diameter be fixed because control of the aperture stop SP becomes easy.

On the other hand, the aperture stop diameter may be variable to be decreased in the range from the intermediate zoom range to the telephoto end. According to this configuration, it is possible to cut off the flare component of the off-axial light beam in the range from the intermediate zoom range to the telephoto end and to decrease the height on the front lens through which the off-axial light flux passes, and hence the front lens effective diameter can be reduced. In each embodiment, the aperture stop SP is moved as described above, so as to reduce the height from the optical axis of the peripheral light beam that passes through the front lens at a zoom position close to the wide angle end. As a result, the front lens effective diameter is determined by the incident height of the peripheral light beam at the first intermediate zoom position. In order to achieve further reduction of the front lens effective diameter, it is preferred to decrease the incident height of the light beam that passes through the front lens at the first intermediate zoom position. Therefore, it is preferred that the first lens unit L1 move along a locus convex toward the image plane side during zooming so as to be closer to the aperture stop SP at the first intermediate zoom position. Note that, the method of moving the first lens unit L1 to the first intermediate zoom position toward the image plane side and then toward the object side from the first intermediate zoom position at the telephoto end can give sufficient zooming ratio to the second lens unit L2. The above description is the condition of the movement loci of the lens unit and the aperture stop during zooming for achieving a high zoom ratio and a small front lens effective diameter in each embodiment.

Next, the negative refractive power of the fourth lens unit L4 disposed closer to the image plane side than the aperture stop SP is described. Because the lens unit having negative refractive power is disposed closer to the image plane side than the aperture stop SP, the front lens effective diameter can be reduced compared with the zoom lens of four-unit structure including positive, negative, positive, and positive lenses, which is advantageous for achieving a wide field angle. The reason is described as follows. The off-axial light beam has the light beam height that is reversed with respect to the optical axis between the object side and the image plane side with respect to the aperture stop SP. The off-axial light beam is affected by the diverging action when passing through the lens unit having negative refractive power disposed closer to the image plane side than the aperture stop SP, but the off-axial light beam closer to the object side than the aperture stop SP at which the incident height of the light beam is reversed is affected by the converging action. Therefore, the structure in which the fourth lens unit L4 having negative refractive power is disposed closer to the image plane side than the aperture stop SP can further reduce the incident height of the off-axial light beam that passes through the front lens. In addition, because the fourth lens unit L4 can share the zooming ratio, the structure is also advantageous for realizing a high zoom ratio of the zoom lens compared with the zoom lens of the four-unit structure including positive, negative, positive, and positive lenses. In each embodiment, as described above, the movement loci of the aperture stop SP and the first lens unit L1 during zooming are set, and the negative refractive power of the fourth lens unit L4 disposed closer to the image plane side than the aperture stop SP is appropriately set, so as to achieve a high zoom ratio and reduction in the front lens effective diameter.

In each embodiment, a focal length of the fourth lens unit L4 is denoted by f4, and a focal length of the entire system at the telephoto end is denoted by ft. A movement amount of the first lens unit L1 in the optical axis direction at the telephoto end with respect to the wide angle end is denoted by m1, and a movement amount of the first lens unit L1 in the optical axis direction from the wide angle end to the zoom position where the first lens unit L1 is positioned closest to the image plane side is denoted by m1mid. Then, the following conditional expressions are satisfied.

$$0.10 < |f4/ft| < 0.45 \quad (1)$$

$$0.03 < |m1mid/m1| < 0.70 \quad (2)$$

The movement amount m1 is a difference between positions of the first lens unit L1 at the wide angle end and at the telephoto end, and the movement amount m1mid is a difference between positions of the first lens unit L1 at the wide angle end and at the first intermediate zoom position. In addition, a sign of the movement amount is set to be positive if the position of the lens unit at each of the telephoto end and the first intermediate zoom position is closer to the image plane side compared with the position at the wide angle end.

Next, technical meanings of conditional expressions (1) and (2) are described. The conditional expression (1) defines refractive power of the fourth lens unit L4. If the refractive power of the fourth lens unit L4 becomes too small beyond the upper limit value of the conditional expression (1), the diverging action applied to the off-axial light beam on the image plane side of the aperture stop SP becomes too small. As a result, the incident height of the off-axial light beam that passes through the front lens (first lens unit L1) becomes large, and hence it becomes difficult to achieve reduction in the front lens effective diameter. In addition, the share of zooming of the fourth lens unit L4 becomes too small, and hence it becomes difficult to achieve a high zoom ratio. If the refractive power of the fourth lens unit L4 becomes too large below the lower limit value of the conditional expression (1), the diverging action of the fourth lens unit L4 applied to the off-axial light beam becomes too large, and generated curvature of field or lateral chromatic aberration becomes too large, and hence it becomes difficult to correct the generated curvature of field or lateral chromatic aberration by another lens unit.

The conditional expression (2) defines the movement locus of the first lens unit L1 accompanying zooming. The first lens unit L1 moves along a locus convex toward the image plane side, and hence the entrance pupil distance is decreased in the range from the wide angle end to a vicinity of the first intermediate zoom position. Thus, a small front lens effective diameter is realized. If the movement amount of the first lens unit L1 at the first intermediate zoom position becomes too large beyond the upper limit value of the conditional expression (2), a variation of the curvature of field becomes too large in the vicinity of the first intermediate zoom position that is an inflection point of the movement locus, and hence it becomes difficult to correct the inflection point by another lens unit. On the contrary, if the movement amount of the first lens unit L1 to the image plane side becomes too small below the lower limit value of the conditional expression (2), the incident height of the off-axial light beam that passes through the front lens in the vicinity of the first intermediate zoom position increases, and hence the front lens effective diameter increases inappropriately. It is more preferred to set the numeric value ranges of the conditional expressions (1) and (2) as follows.

$$0.12<|f4/ft|<0.42 \quad (1a)$$

$$0.08<m1\text{mid}/|m1|<0.65 \quad (2a)$$

In addition, it is more preferred to set the numeric value ranges of the conditional expressions (1a) and (2a).

$$0.13<|f4/ft|<0.40 \quad (1b)$$

$$0.12<m1\text{mid}/|m1|<0.60 \quad (2b)$$

With the structure described above, it is possible to obtain the zoom lens having a small front lens effective diameter, a wide field angle, a high zoom ratio, and high optical performance in which various aberrations including on-axis chromatic aberration, lateral chromatic aberration, spherical aberration, and curvature of field are sufficiently corrected over the entire zoom range.

In each embodiment, it is more preferred to satisfy one or more of the following conditions. Intervals between the aperture stop SP and the lens surface of the third lens unit L3 closest to the object side at the wide angle end and at the telephoto end are denoted by dspw and dspt, respectively. An interval between the lens surface of the second lens unit L2 closest to the image plane side and the lens surface of the third lens unit L3 closest to the object side at the wide angle end is denoted by d23w. Focal lengths of the first, second, and fifth lens units L1, L2, and L5 are denoted by f1, f2, and f5, respectively. A focal length of the entire system at the wide angle end is denoted by fw. The first lens unit L1 includes one or more positive lenses. The refractive index on a d-line of material of the positive lens disposed closest to the object side among the positive lenses is denoted by nd1p, and the Abbe number of the material is denoted by vd1p.

The lateral magnifications of the second lens unit L2 at the wide angle end and at the telephoto end are denoted by β2w and β2t, respectively. The lateral magnifications of the third lens unit L3 at the wide angle end and at the telephoto end are denoted by β3w and β3t, respectively. The movement amount of the second lens unit L2 in the optical axis direction at the telephoto end with respect to the wide angle end is denoted by m2. Back focuses at the wide angle end and at the telephoto end are denoted by BFw and BFt, respectively. In this case, it is preferred to satisfy one or more of the following conditional expressions.

$$0.05<(dspw-dspt)/d23w<0.40 \quad (3)$$

$$8.0<f1/fw<30.0 \quad (4)$$

$$vd1p>65.0 \quad (5)$$

$$nd1p>-0.0050 \cdot vd1p+1.885 \quad (6)$$

$$1.5<(\beta2t/\beta2w)/(\beta3t/\beta3w)<5.0 \quad (7)$$

$$-12.0<f1/f2<-4.0 \quad (8)$$

$$2.0<f5/fw<15.0 \quad (9)$$

$$10<(\beta2t\cdot\beta3t)/(\beta2w\cdot\beta3w)<40 \quad (10)$$

$$-3.5<m1/m2<0.0 \quad (11)$$

$$0.7<BFt/BFw<1.3 \quad (12)$$

Note that, the back focus is defined to be an air-converted value of the distance between the lens final surface and the paraxial image surface. In addition, the movement amount m2 is a difference between a position of the second lens unit L2 at the wide angle end and that at the telephoto end. In addition, a sign of the movement amount m2 is regarded to be positive when the lens is closer to the image plane side at the telephoto end with respect to the wide angle end.

Next, technical meanings of the conditional expressions described above are described. The conditional expression (3) defines movement of the aperture stop SP accompanying zooming. If the interval between the aperture stop SP and the third lens unit L3 becomes too large at the wide angle end beyond the upper limit value of the conditional expression (3), the incident height of the on-axis light beam that passes through the third lens unit L3 becomes too large at the wide angle end. As a result, the effective diameter of the lens that constitutes the third lens unit L3 becomes too large inappropriately. In addition, the center thickness of the positive lens that constitutes the third lens unit L3 increases, and the thickness of the entire third lens unit L3 in the optical axis direction increases, and hence the total lens length increases. On the contrary, if the interval between the aperture stop SP and the third lens unit L3 becomes too small at the wide angle end below the lower limit value of the conditional expression (3), the entrance pupil distance becomes too large in the range from the wide angle end to the intermediate zoom range, and hence the front lens effective diameter is increased.

The conditional expression (4) defines the refractive power of the first lens unit L1. If the refractive power of the first lens unit L1 becomes too small beyond the upper limit value of the conditional expression (4), the refractive powers of the third lens unit L3 and the fourth lens unit L4 become too large to achieve a wide field angle having an imaging half field angle of approximately 35 degrees or more at the wide angle end. As a result, it becomes difficult to correct sufficiently image surface variation and flare on the periphery of the screen during zooming. In addition, the movement amount of the first lens unit L1 during zooming increases, and hence the total lens length and the front lens effective diameter are increased. On the contrary, if the refractive power of the first lens unit L1 becomes too large below the lower limit value of the conditional expression (4), much lateral chromatic aberration is generated at the wide angle end where the incident height of the off-axial light beam on the first lens unit L1 is large, and hence it becomes difficult to correct the lateral chromatic aberration by another lens unit.

The conditional expressions (5) and (6) define material of a positive lens G1p that is included in the first lens unit L1 and is disposed closest to the object side. If the Abbe number dip of the material of the positive lens G1p becomes too small beyond the value of the right side of the conditional expression (5), it becomes difficult to correct a secondary spectrum generated in the first lens unit L1. In particular, secondary spectra of the on-axis chromatic aberration and the lateral chromatic aberration increase at the telephoto end. As a result, color stain on the contour of the subject of the taken image increases particularly at the telephoto end, and the resolution decreases, and hence it becomes difficult to obtain high optical performance. In addition, if the refractive index of material of the positive lens G1p becomes too small beyond the value defined by the right side of the conditional expression (6), the curvature of the lens surface of the positive lens G1p becomes large (steep). Therefore, much spherical aberration is generated, and hence it becomes difficult to correct the spherical aberration by another lens.

The conditional expression (7) defines a ratio between the zooming ratios of the second lens unit L2 and the third lens unit L3. If the zooming ratio of the second lens unit L2 becomes too large beyond the upper limit value of the conditional expression (7), various aberration variations such as lateral chromatic aberration and curvature of field generated in the second lens unit L2 accompanying zooming become too large, and hence it becomes difficult to correct the aberration variations by another lens. On the contrary, if the zooming ratio of the third lens unit L3 becomes too large below the lower limit value of the conditional expression (7), spherical aberration generated in the third lens unit L3 accompanying zooming becomes too large, and hence it becomes difficult to correct the spherical aberration by another lens unit.

The conditional expression (8) defines a ratio between the refractive power of the first lens unit L1 and the refractive power of the second lens unit L2. If the refractive power of the second lens unit L2 becomes too small beyond the upper limit value of the conditional expression (8), the movement amount for securing a zooming ratio necessary for the second lens unit L2 increases, and hence the total lens length and the front lens effective diameter increase. On the contrary, if the refractive power of the second lens unit L2 becomes too large below the lower limit value of the conditional expression (8), much lateral chromatic aberration or curvature of field is generated from the second lens unit L2, and variation accompanying zooming becomes too large, and hence it becomes difficult to correct the same by another lens unit.

The conditional expression (9) defines a refractive power of the fifth lens unit L5. If the refractive power of the fifth lens unit L5 becomes too small beyond the upper limit value of the conditional expression (9), correction ability for the image plane variation accompanying zooming becomes insufficient at the zoom position close to the telephoto end. As a result, a movement amount of the fifth lens unit L5 during zooming becomes too large so that the total lens length is increased. In addition, at the zoom position close to the telephoto end, a movement amount of the fifth lens unit L5 accompanying focusing becomes too large to set a distance to an object at a short distance. On the other hand, if the refractive power of the fifth lens unit L5 becomes too large below the lower limit value of the conditional expression (9), variations of aberrations such as on-axis chromatic aberration, lateral chromatic aberration, and curvature of field accompanying focusing become too large, and hence optical performance of an object at a short distance is deteriorated.

The conditional expression (10) defines zooming ratios of the second lens unit L2 and the third lens unit L3. If the zooming ratios of the second lens unit L2 and the third lens unit L3 become too large beyond the upper limit value of the conditional expression (10), variations of the lateral chromatic aberration, the spherical aberration, and the curvature of field accompanying zooming become too large, and hence it becomes difficult to correct the variations by another lens unit. If the zooming ratios of the second lens unit L2 and the third lens unit L3 become too small below the lower limit value of the conditional expression (10), it becomes difficult to obtain a high zoom ratio.

The conditional expression (11) defines movement amounts of the first lens unit L1 and the second lens unit L2 during zooming. If the first lens unit L1 and the second lens unit L2 move to be positioned in the same direction at the telephoto end compared with the wide angle end beyond the upper limit value of the conditional expression (11), it becomes difficult to obtain a sufficient zooming ratio by the second lens unit L2, and hence it becomes difficult to obtain a high zoom ratio. In addition, on the contrary, if the movement amount of the first lens unit L1 becomes too large below the lower limit value of the conditional expression (11), the total lens length increases, and the incident height of the off-axial light beam that passes through the first lens unit L1 at a zoom position close to the telephoto end increases, and hence the front lens effective diameter increases.

The conditional expression (12) defines a ratio between the back focuses at the wide angle end and at the telephoto end. If the back focus becomes too long at the telephoto end beyond the upper limit value of the conditional expression (12), the total lens length at the telephoto end increases. If the back focus becomes too short at the telephoto end below the lower limit value of the conditional expression (12), it becomes difficult to absorb a variation of the back focus due to a manufacturing error of the lens, and hence it becomes difficult to secure focus on an infinity distance object. Note that, it is preferred to set the numeric value ranges in the conditional expressions (3) to (5) and (7) to (12) as follows.

$$0.07 < (dspw - dspt)/d23w < 0.35 \quad (3a)$$

$$9.0 < f1/fw < 25.0 \quad (4a)$$

$$vd1p > 66.5 \quad (5a)$$

$$1.8 < (\beta 2t/\beta 2w)/(\beta 3t/\beta 3w) < 4.0 \quad (7a)$$

$$-10.0 < f1/f2 < -5.0 \quad (8a)$$

$$2.5 < f5/fw < 13.0 \quad (9a)$$

$$12 < (\beta 2t \cdot \beta 3t)/(\beta 2w \cdot \beta 3w) < 33 \quad (10a)$$

$$-3.0 < m1/m2 < -0.2 \quad (11a)$$

$$0.8 < BFt/BFw < 1.2 \quad (12a)$$

In addition, it is more preferred to set the numeric value ranges in the conditional expressions (3a) to (5a) and (7a) to (12a) as follows to maximize the effect obtained by each conditional expression.

$$0.08 < (dspw - dspt)/d23w < 0.30 \quad (3b)$$

$$10.0 < f1/fw < 22.0 \quad (4b)$$

$$vd1p > 68.0 \quad (5b)$$

$$2.0 < (\beta 2t/\beta 2w)/(\beta 3t/\beta 3w) < 3.2 \quad (7b)$$

$$-9.0 < f1/f2 < -6.0 \quad (8b)$$

$$3.0 < f5/fw < 12.0 \quad (9b)$$

$$15 < (\beta 2t \cdot \beta 3t)/(\beta 2w \cdot \beta 3w) < 28 \quad (10b)$$

$$-2.5 < m1/m2 < -0.3 \quad (11b)$$

$$0.90 < BFt/BFw < 1.15 \quad (12b)$$

In each embodiment, it is preferred to constitute the fourth lens unit L4 of one lens component.

The one lens component facilitates reduction of the total lens length, and the weight of the fourth lens unit L4 can be reduced, which are advantageous for driving during zooming. One lens component may be constituted of a single lens or a cemented lens including one or more positive lenses and a negative lens. The cemented lens can facilitate appropriate correction of lateral chromatic aberration at the wide angle end when a wide field angle of the zoom lens is realized. The movement amount of the fourth lens unit L4 during zooming is not large compared with those of the second lens unit L2 and the third lens unit L3, but shares the zooming ratio so as to contribute to realizing a high zoom ratio. It is preferred to constitute the fifth lens unit L5 of one lens component. The fifth lens unit L5 moves for image surface correction accompanying zooming and for focusing. Therefore, the movement amount is large, and frequency thereof is high. For this reason, it is preferred to constitute the fifth lens unit L5 of one lens component so as to realize light weight for reducing drive torque.

In each embodiment, with the structure described above, an imaging half field angle of 32 degrees or larger and a zoom ratio of 20 or larger at the wide angle end are achieved. Note that, it is possible to move a whole or a part of the third lens unit L3, and the fourth lens unit L4 so as to have a component in the direction perpendicular to the optical axis, for correcting a blur of the taken image. The opening diameter of the aperture stop SP may be constant or variable during zooming. If the opening diameter of the aperture stop SP is constant, control of the aperture stop diameter can be simplified. On the other hand, if spherical aberration or flare is large at any zoom position, when the opening diameter of the aperture stop SP is controlled to be small at the zoom position, the unnecessary light can be cut off so as to improve the optical characteristic. As described above, according to each embodiment, it is possible to obtain a zoom lens having a small front lens effective diameter, a small total lens length, a wide field angle, and a high zoom ratio. Next, lens structures of individual embodiments are described.

First Embodiment

Hereinafter, with reference to (A) to (D) in FIG. 1, a zoom lens of a first embodiment of the present invention is described. The zoom lens of the first embodiment includes, in order from the object side to the image side, a first lens unit L1 having positive refractive power, a second lens unit L2 having negative refractive power, a stop (aperture stop) SP, a third lens unit L3 having positive refractive power, a fourth lens unit L4 having negative refractive power, and a fifth lens unit L5 having positive refractive power. In the first embodiment, each lens unit is moved for zooming. In this case, the interval between the first lens unit L1 and the second lens unit L2 becomes larger at the telephoto end than at the wide angle end to increase the zooming ratio of the second lens unit L2. Then, each lens unit is moved so that an interval between the second lens unit L2 and the third lens unit L3 is decreased. Thus, the third lens unit L3 has the zooming effect, and hence variations of spherical aberration and curvature of field accompanying zooming can be suppressed effectively.

The first lens unit L1 is constituted of a cemented lens in which the negative lens G11 having a meniscus shape with a convex surface on the object side and the positive lens G12 are cemented, and a positive lens G13 having a meniscus shape with a convex surface on the object side. The first lens unit L1 is constituted of three lenses, and hence a high zoom ratio is obtained while aberrations such as spherical aberration, on-axis chromatic aberration, and lateral chromatic aberration can be corrected appropriately. The second lens unit L2 is constituted of three lenses including, in order from the object side to the image side, a negative lens having a meniscus shape with a convex surface on the object side, a negative lens having a concave surface toward the image plane side, and a positive lens having a convex surface toward the object side, to thereby suppress various aberration variations accompanying zooming. The third lens unit L3 is constituted of a positive lens having a convex surface toward the object side, a negative lens having a concave surface toward the image plane side, and a positive lens having a convex surface toward the image plane side. With this configuration of the third lens unit L3, object side principal point of the third lens unit L3 can be disposed in a vicinity of the lens surface closest to the object side in the third lens unit L3, which is advantageous for reducing the front lens diameter. In the first embodiment, with the configuration described above, an imaging half field angle of ω=37.9 degrees at the wide angle end and a zoom ratio of 26.8 are achieved.

Second Embodiment

With reference to (A) to (D) in FIG. 3, a zoom lens of a second embodiment of the present invention is described. The zoom lens includes, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having positive refractive power. In the second embodiment, the first lens unit L1 to the fifth lens unit L5 are moved for zooming. In the second embodiment, a half field angle of ω=44.9 degrees at the wide angle end and a zoom factor of approximately 30 are achieved. Compared with the first embodiment, one lens unit is added to be a six-unit structure, and hence higher aberration correction is facilitated. The sixth lens unit L6 does not move for zooming and is disposed at a position close to the image surface. It is sufficient to fix the sixth lens unit L6 in just front of the imaging device (solid-state image pickup element), and hence the zoom lens of this embodiment can be realized without complicating so much the lens barrel structure of the first embodiment. Because the object side surface of the positive lens constituting the sixth lens unit L6 is made to have an aspheric shape, curvature of field is corrected appropriately. The aspheric shape may be applied to the image side surface so as to obtain the same effect.

In order to realize a wide field angle and a high zoom ratio at the wide angle end, the incident angle and the incident height of the peripheral light beam that passes through the second lens unit L2 are different largely between at the wide angle end and at the telephoto end. Therefore, variations of lateral chromatic aberration and curvature of field generated in these lens units due to zooming (zoom variation) cause a problem. Therefore, the second lens unit L2 is constituted of four lenses so that zoom variations of various aberrations accompanying zooming are suppressed to be small, and one surface of the lens is made to have an aspheric shape. Thus, in particular, curvature of field generated at the wide angle end in the over direction is corrected appropriately. Other lens structures of the lens units are the same as those of the first embodiment.

Third Embodiment

With reference to (A) to (D) in FIG. 5, the zoom lens of a third embodiment of the present invention is described. The lens structure is the five-unit structure that is the same as that of the first embodiment. The first lens unit L1 to the fifth lens unit L5 are moved for zooming. In order to achieve an imaging half field angle of ω=45.7 degrees and a zoom factor of approximately 30 in the third embodiment at the wide angle end, the fourth lens unit L4 is constituted of a cemented lens (lens component) including a positive lens and a negative lens. Thus, variations of lateral chromatic aberration and curvature of field accompanying zooming are corrected appropriately. In addition, in order to increase an imaging field angle at a wide angle end, it is necessary to increase the refractive power of the second lens unit L2. Accompanying this, a large curvature of field in the over direction is generated in the second lens unit L2 at the wide angle end. Therefore, a surface of the lens of the second lens unit L2 positioned closest to the object side on the image plane side is made to have an aspheric shape in which a local curvature radius increases (i.e., power is weakened) in the vicinity of the lens surface. Thus, a curvature of field is corrected at the wide angle end so that flatness of the image surface is maintained appropriately. In addition, the lens that constitutes the second lens unit L2 is made of glass material having high refractive index. Thus, an increase of Petzval sum is suppressed in the negative direction accompanying an increase of the refractive power of the second lens unit L2 due to a wide field angle and a high zoom ratio. Other lens structures of the lens units are the same as those of the first embodiment.

Fourth Embodiment

With reference to (A) to (D) in FIG. 7, a zoom lens of a fourth embodiment of the present invention is described. The lens structure is the five-unit structure that is the same as that of the third embodiment. The first lens unit L1 to the fifth lens unit L5 are moved for zooming. In this embodiment, in order to realize a wider field angle at the wide angle end, the second lens unit L2 is constituted of four lenses each having an aspheric surface, so as to suppress occurrence of various aberrations such as lateral chromatic aberration and curvature of field at the wide angle end. In the fourth embodiment, an imaging half field angle of $\omega=47.1$ degrees at the wide angle end and a zoom factor of approximately 30 are achieved. Other lens structures of the lens units are the same as those of the third embodiment.

Fifth Embodiment

With reference to (A) to (D) in FIG. 9, a zoom lens of a fifth embodiment of the present invention is described. The lens structure is the five-unit structure that is the same as that of the first embodiment. In this embodiment, the third lens unit L3 does not move for zooming. Thus, an actuator for driving the third lens unit L3 becomes unnecessary so that the lens drive mechanism can be simplified, which is advantageous for reduction of power consumption and for silent drive. In the fifth embodiment, an imaging half field angle of $\omega=37.9$ degrees at the wide angle end and a zoom factor of approximately 20 are achieved.

Sixth Embodiment

With reference to (A) to (D) in FIG. 11, a zoom lens of a sixth embodiment of the present invention is described. The zoom lens includes, in order from the object side to the image side, a first lens unit L1 having positive refractive power, a second lens unit L2 having negative refractive power, a third lens unit L3 having positive refractive power, a fourth lens unit L4 having negative refractive power, a fifth lens unit L5 having positive refractive power, and a sixth lens unit L6 having negative refractive power. The fourth lens unit L4 and the sixth lens unit L6 do not move for zooming. Thus, reduction of the number of actuators for driving the lens units and simplification of the lens drive mechanism are realized, and hence this embodiment is advantageous for reduction of power consumption and for silent drive compared with the case where the lens units are driven. In addition, the sixth lens unit L6 is disposed at a position close to the image surface. Because a surface of the lens that constitutes the sixth lens unit L6 on the object side has an aspheric shape, curvature of field is corrected appropriately. The aspheric shape may be applied to the image side surface so as to obtain the same effect. In the sixth embodiment, an imaging half field angle of $\omega=36.0$ degrees at the wide angle end and a zoom factor of approximately 20 are achieved.

Exemplary embodiments of the present invention are described above, but the present invention is not limited to those embodiments, which can be modified or changed variously within the scope of the spirit. The optical system described above in the embodiments is suitable for an imaging lens for a camera. When the camera is a digital still camera or a digital video camera, the camera includes a solid-state image pickup element which receives light of an image formed by the imaging lens. In each embodiment, negative distortion aberration is generated largely in the vicinity of the wide angle end so that an imaging range of the solid-state image pickup element is set to be a range smaller than that in other zoom position. Distortion of the obtained image information may be corrected electrically in a signal processing circuit which processes image data of the solid-state image pickup element, and hence an image with little distortion can be output.

Next, an embodiment of a digital still camera in which the zoom lens according to the present invention is used as a photographing optical system is described with reference to FIG. 13. In FIG. 13, the digital still camera includes a camera main body 20 and a photographing optical system 21 constituted of any one of the zoom lens described above in the first to sixth embodiments. The digital still camera also includes a solid-state image pickup element (photoelectric transducer element) 22 such as a CCD sensor or a CMOS sensor incorporated in the camera main body for receiving an image of a subject formed by the photographing optical system 21. The digital still camera also includes a memory 23 for recording information corresponding to the image of a subject, on which photoelectric conversion has been performed by the solid-state image pickup element 22. The digital still camera also includes a finder 24 constituted of a liquid crystal display panel or the like for observing the image of a subject formed on the solid-state image pickup element 22. In this way, by using the zoom lens according to the present invention for an image pickup apparatus such as a digital still camera or a video camera, it is possible to provide a small-sized image pickup apparatus having high optical performance. In each embodiment, negative distortion is generated largely at the wide angle end, and hence the imaging range of the solid-state image pickup element is set to a range smaller than at other zoom positions. It is possible to correct distortion of the obtained image information electrically by a signal processing circuit for processing a signal from the solid-state image pickup element, so as to output an image with little distortion.

In the following, Numerical Embodiments corresponding respectively to the embodiments of the present invention are described. In each Numerical Embodiment, surface number i denotes an order of optical surfaces from the object side, ri denotes a curvature radius of the i-th optical surface, di denotes a distance between the i-th surface and the (i+1)th surface, and ndi and vdi respectively denote a refractive index and an Abbe number of material of the i-th optical member with respect to the d-line. The back focus (BF) is defined to be an air-converted value of the distance between the lens final surface and the paraxial image surface, and the total lens length is defined to be a value obtained by adding the back focus (BF) to a distance between the lens front surface and the lens final surface. A unit of length is mm. In addition, K denotes an eccentricity, A4, A6, A8, and A10 denote aspherical coefficients, and a displacement in the optical axis direction at a position of height H from the optical axis with respect to a surface apex is denoted by x. Then, the aspherical shape is expressed by the following equation.

$$X = \frac{(1/R)H^2}{1+\sqrt{1-(1+K)(H/R)^2}} + A4H^4 + A6H^6 + A8H^8 + A10H^{10}$$ (Equation 1)

where R denotes a curvature radius. Further, for example, the expression of "e-Z" means "$10^{-z}$". In addition, correspondence between the above-mentioned conditional expressions and each Numerical Embodiment is shown in Table 1. Symbol f denotes a focal length, Fno denotes an F number, and ω denotes a half field angle. The half field angle is a value determined by a light beam trace.

Numerical Embodiment 1
Unit: mm

Surface data

| Surface No. (i) | r | d | nd | νd |
|---|---|---|---|---|
| 1 | 121.799 | 1.60 | 1.80610 | 33.3 |
| 2 | 49.556 | 4.62 | 1.49700 | 81.5 |
| 3 | −194.668 | 0.18 | | |
| 4 | 42.248 | 3.00 | 1.60311 | 60.6 |
| 5 | 133.383 | (Variable) | | |
| 6 | 84.974 | 1.00 | 1.88300 | 40.8 |
| 7 | 8.369 | 4.26 | | |
| 8 | −24.608 | 0.70 | 1.77250 | 49.6 |
| 9 | 58.741 | 0.22 | | |
| 10 | 18.926 | 2.07 | 1.94595 | 18.0 |
| 11 | 102.403 | (Variable) | | |
| 12 (Stop) | ∞ | (Variable) | | |
| 13* | 10.353 | 2.80 | 1.58313 | 59.4 |
| 14* | −109.462 | 2.90 | | |
| 15 | 23.498 | 0.70 | 1.84666 | 23.9 |
| 16 | 9.540 | 0.66 | | |
| 17 | 18.598 | 1.97 | 1.48749 | 70.2 |
| 18 | −25.104 | (Variable) | | |
| 19 | 782.644 | 0.70 | 1.48749 | 70.2 |
| 20 | 24.650 | (Variable) | | |
| 21 | 17.657 | 1.65 | 1.48749 | 70.2 |
| 22 | −1178.697 | (Variable) | | |
| 23 | ∞ | 0.80 | 1.51633 | 64.1 |
| 24 | ∞ | 0.50 | | |
| Image plane | ∞ | | | |

Aspherical Surface data

Thirteenth surface

K = 5.51145e−001   A4 = −1.38948e−004   A6 = −8.42963e−007
A8 = −1.89369e−008

Fourteenth surface

K = −1.00023e+001   A4 = 4.54336e−005

Various data
Zoom ratio 26.79

| Focal length | 5.15 | 8.68 | 26.98 | 137.95 |
|---|---|---|---|---|
| F number | 2.87 | 3.56 | 4.75 | 5.76 |
| Half field angle | 37.9 | 24.9 | 8.16 | 1.60 |
| Image height | 3.49 | 3.88 | 3.88 | 3.88 |
| Total lens length | 90.92 | 85.01 | 103.56 | 127.20 |
| BF | 10.18 | 12.52 | 20.94 | 10.73 |
| d5 | 0.78 | 6.37 | 31.22 | 57.27 |
| d11 | 31.79 | 22.02 | 10.64 | 2.46 |
| d12 | 10.87 | 4.78 | 1.08 | 0.80 |
| d18 | 2.59 | 4.26 | 6.26 | 8.71 |
| d20 | 5.68 | 6.01 | 4.38 | 18.20 |
| d22 | 9.15 | 11.50 | 19.92 | 9.70 |

Zoom lens unit data

| Unit | First surface | Focal length |
|---|---|---|
| 1 | 1 | 78.27 |
| 2 | 6 | −10.23 |
| 3 | 13 | 18.01 |
| 4 | 19 | −52.23 |
| 5 | 21 | 35.70 |

Numerical Embodiment 2

Surface data

| Surface No. (i) | r | d | nd | νd |
|---|---|---|---|---|
| 1 | 85.200 | 1.60 | 1.80000 | 29.8 |
| 2 | 41.164 | 6.05 | 1.49700 | 81.5 |
| 3 | 1981.992 | 0.18 | | |
| 4 | 42.972 | 3.38 | 1.71300 | 53.9 |
| 5 | 163.523 | (Variable) | | |
| 6 | 120.140 | 1.00 | 1.80400 | 46.6 |
| 7 | 8.988 | 3.38 | | |
| 8 | 21.988 | 0.80 | 1.85960 | 40.4 |
| 9* | 11.179 | 2.96 | | |
| 10 | −121.625 | 0.70 | 1.81600 | 46.6 |
| 11 | 30.103 | 0.30 | | |
| 12 | 16.537 | 2.12 | 1.92286 | 18.9 |
| 13 | 73.840 | (Variable) | | |
| 14 (Stop) | ∞ | (Variable) | | |
| 15* | 7.856 | 2.62 | 1.58313 | 59.4 |
| 16* | 21.340 | 3.07 | | |
| 17 | 17.051 | 0.70 | 1.80518 | 25.4 |
| 18 | 8.004 | 0.32 | | |
| 19 | 9.507 | 2.79 | 1.48749 | 70.2 |
| 20 | −9.954 | (Variable) | | |
| 21 | −7.647 | 0.70 | 1.77250 | 49.6 |
| 22 | −16.822 | (Variable) | | |
| 23 | 28.147 | 1.70 | 1.48749 | 70.2 |
| 24 | −96.067 | (Variable) | | |
| 25* | 68.321 | 1.00 | 1.55332 | 71.7 |
| 26 | 153.178 | 1.00 | | |
| 27 | ∞ | 0.80 | 1.51633 | 64.1 |
| 28 | ∞ | 0.50 | | |
| Image plane | ∞ | | | |

Aspherical Surface data

Ninth surface

K = −8.45926e−001   A4 = 3.70989e−005   A6 = −1.14391e−007

Fifteenth surface

K = 7.23287e−002   A4 = −1.12090e−004   A6 = −1.00884e−006
A8 = −3.88181e−008

Sixteenth surface

K = −1.00023e+001   A4 = 2.35114e−004

Twenty-fifth surface

K = −4.82923e+001   A4 = −1.50317e−004   A6 = 2.85996e−006

Numerical Embodiment 2

Various data
Zoom ratio 29.86

| | | | | |
|---|---|---|---|---|
| Focal length | 3.95 | 7.34 | 21.44 | 117.99 |
| F number | 2.77 | 3.34 | 4.34 | 5.76 |
| Half field angle | 44.9 | 28.2 | 10.1 | 1.86 |
| Image height | 3.49 | 3.88 | 3.88 | 3.88 |
| Total lens length | 91.75 | 85.38 | 101.15 | 126.62 |
| BF | 2.03 | 2.03 | 2.03 | 2.03 |
| d5 | 0.78 | 6.46 | 25.81 | 50.32 |
| d13 | 30.98 | 16.87 | 5.76 | 1.57 |
| d14 | 11.13 | 8.04 | 5.60 | 1.32 |
| d20 | 1.90 | 1.91 | 1.93 | 1.96 |
| d22 | 2.69 | 5.91 | 8.63 | 24.05 |
| d24 | 6.88 | 8.79 | 16.03 | 10.00 |

Zoom lens unit data

| Unit | First surface | Focal length |
|---|---|---|
| 1 | 1 | 71.32 |
| 2 | 6 | −8.80 |
| 3 | 15 | 12.65 |
| 4 | 21 | −18.77 |
| 5 | 23 | 44.86 |
| 6 | 25 | 221.96 |

Numerical Embodiment 3

Surface data

| Surface No. (i) | r | d | nd | vd |
|---|---|---|---|---|
| 1 | 79.548 | 1.40 | 2.00069 | 25.5 |
| 2 | 48.163 | 4.93 | 1.49700 | 81.5 |
| 3 | 46140.146 | 0.15 | | |
| 4 | 47.433 | 3.21 | 1.77250 | 49.6 |
| 5 | 153.622 | (Variable) | | |
| 6 | 180.621 | 1.10 | 1.88300 | 40.8 |
| 7 | 9.363 | 4.17 | | |
| 8 | 77.921 | 1.00 | 1.85960 | 40.4 |
| 9* | 10.888 | 2.59 | | |
| 10 | 18.975 | 2.23 | 1.94595 | 18.0 |
| 11 | 105.900 | (Variable) | | |
| 12 (Stop) | ∞ | (Variable) | | |
| 13* | 7.739 | 2.90 | 1.58313 | 59.4 |
| 14* | 19.349 | 3.62 | | |
| 15 | 16.658 | 0.70 | 1.80518 | 25.4 |
| 16 | 7.512 | 0.22 | | |
| 17 | 8.191 | 2.59 | 1.48749 | 70.2 |
| 18 | −9.227 | (Variable) | | |
| 19 | −7.147 | 0.55 | 1.77250 | 49.6 |
| 20 | −22.848 | 1.00 | 1.48749 | 70.2 |
| 21 | −16.607 | (Variable) | | |
| 22 | 29.150 | 1.70 | 1.48749 | 70.2 |
| 23 | −37.230 | (Variable) | | |
| 24 | ∞ | 0.80 | 1.51633 | 64.1 |
| 25 | ∞ | 0.80 | | |
| Image plane | ∞ | | | |

Aspherical Surface data

Ninth surface

K = −8.88155e−001  A4 = −5.86626e−005  A6 = −2.32149e−007
A8 = −3.41828e−009

Thirteenth surface

K = −2.16367e−001  A4 = −6.54315e−006  A6 = 2.96112e−007
A8 = −2.57814e−008

Fourteenth surface

K = −1.00023e+001  A4 = 3.61034e−004

Various data
Zoom ratio 29.87

| | | | | |
|---|---|---|---|---|
| Focal length | 3.85 | 7.40 | 21.13 | 114.99 |
| F number | 2.87 | 3.78 | 4.65 | 5.76 |
| Half field angle | 45.7 | 28.4 | 10.3 | 1.93 |
| Image height | 3.49 | 3.88 | 3.88 | 3.88 |
| Total lens length | 90.07 | 80.37 | 101.14 | 126.73 |
| BF | 9.13 | 10.88 | 16.70 | 9.94 |
| d5 | 0.78 | 4.47 | 26.76 | 53.64 |
| d11 | 37.08 | 21.57 | 7.65 | 1.59 |
| d12 | 5.42 | 1.25 | 2.59 | 1.34 |
| d18 | 1.95 | 2.03 | 2.03 | 2.06 |
| d21 | 1.63 | 6.10 | 11.34 | 24.09 |
| d23 | 7.81 | 9.55 | 15.37 | 8.61 |

Zoom lens unit data

| Unit | First surface | Focal length |
|---|---|---|
| 1 | 1 | 74.39 |
| 2 | 6 | −9.18 |
| 3 | 13 | 12.39 |
| 4 | 19 | −15.88 |
| 5 | 22 | 33.82 |

Numerical Embodiment 4

Surface data

| Surface No. (i) | r | d | nd | vd |
|---|---|---|---|---|
| 1 | 88.341 | 1.40 | 2.00069 | 25.5 |
| 2 | 51.711 | 4.76 | 1.49700 | 81.5 |
| 3 | −533.545 | 0.15 | | |
| 4 | 47.021 | 3.21 | 1.77250 | 49.6 |
| 5 | 134.387 | (Variable) | | |
| 6 | 222.276 | 1.00 | 1.88300 | 40.8 |
| 7 | 9.418 | 3.74 | | |
| 8 | 33.065 | 1.00 | 1.85960 | 40.4 |
| 9* | 9.308 | 1.94 | | |
| 10 | 24.992 | 1.00 | 1.48749 | 70.2 |
| 11 | 18.144 | 0.84 | | |
| 12 | 16.663 | 2.28 | 1.92286 | 18.9 |
| 13 | 75.945 | (Variable) | | |
| 14 (Stop) | ∞ | (Variable) | | |
| 15* | 7.809 | 2.51 | 1.55332 | 71.7 |
| 16* | 33.977 | 3.17 | | |
| 17 | 15.741 | 0.70 | 1.80518 | 25.4 |
| 18 | 8.129 | 0.42 | | |
| 19 | 11.872 | 2.28 | 1.48749 | 70.2 |
| 20 | −10.484 | (Variable) | | |
| 21 | −7.560 | 0.55 | 1.80400 | 46.6 |
| 22 | 78.309 | 1.25 | 1.48749 | 70.2 |
| 23 | −11.119 | (Variable) | | |
| 24 | 27.138 | 1.70 | 1.48749 | 70.2 |
| 25 | −33.257 | (Variable) | | |
| 26 | ∞ | 0.80 | 1.51633 | 64.1 |
| 27 | ∞ | 1.00 | | |
| Image plane | ∞ | | | |

-continued

Numerical Embodiment 4

Aspherical Surface data

Ninth surface

K = −2.37707e+000    A4 = 1.61662e−004    A6 = −1.57508e−006

Fifteenth surface

K = −3.51719e−001    A4 = −9.49961e−006    A6 = −4.43262e−007
A8 = 5.01439e−009

Sixteenth surface

K = −1.00023e+001    A4 = 1.75529e−004

Various data
Zoom ratio 29.56

| | | | | |
|---|---|---|---|---|
| Focal length | 3.65 | 7.07 | 19.95 | 108.00 |
| F number | 2.87 | 3.70 | 4.56 | 5.76 |
| Half field angle | 47.1 | 28.7 | 10.9 | 1.96 |
| Image height | 3.49 | 3.88 | 3.88 | 3.70 |
| Total lens length | 89.74 | 83.62 | 99.91 | 127.25 |
| BF | 8.51 | 9.88 | 16.60 | 9.33 |
| d5 | 0.70 | 7.53 | 27.32 | 54.61 |
| d13 | 34.88 | 21.32 | 7.34 | 1.60 |
| d14 | 7.78 | 2.89 | 2.71 | 2.38 |
| d20 | 2.61 | 2.72 | 2.72 | 2.79 |
| d23 | 1.36 | 5.38 | 9.31 | 22.64 |
| d25 | 6.98 | 8.35 | 15.08 | 7.81 |

Zoom lens unit data

| Unit | First surface | Focal length |
|---|---|---|
| 1 | 1 | 75.11 |
| 2 | 6 | −8.94 |
| 3 | 15 | 12.48 |
| 4 | 21 | −16.34 |
| 5 | 24 | 30.94 |

Numerical Embodiment 5

Surface data

| Surface No. (i) | r | d | nd | vd |
|---|---|---|---|---|
| 1 | 88.862 | 1.30 | 1.90366 | 31.3 |
| 2 | 50.706 | 6.58 | 1.43387 | 95.1 |
| 3 | −294.700 | 0.18 | | |
| 4 | 46.692 | 4.60 | 1.60311 | 60.6 |
| 5 | 201.469 | (Variable) | | |
| 6 | 209.273 | 0.65 | 1.91082 | 35.3 |
| 7 | 8.482 | 3.68 | | |
| 8 | −39.316 | 0.50 | 1.83481 | 42.7 |
| 9 | 24.823 | 0.56 | | |
| 10 | 20.991 | 1.97 | 2.00178 | 19.3 |
| 11* | −276.414 | (Variable) | | |
| 12 (Stop) | ∞ | (Variable) | | |
| 13* | 12.722 | 2.15 | 1.58313 | 59.4 |
| 14* | −42.406 | 3.73 | | |
| 15 | 37.545 | 0.60 | 2.00069 | 25.5 |
| 16 | 11.693 | 0.30 | | |
| 17 | 14.132 | 1.91 | 1.51742 | 52.4 |
| 18 | −16.875 | 0.30 | | |
| 19 | ∞ | (Variable) | | |
| 20 | −165.497 | 0.55 | 1.59282 | 68.6 |
| 21 | 12.483 | (Variable) | | |
| 22 | 14.630 | 3.28 | 1.69680 | 55.5 |
| 23 | −20.789 | 0.50 | 1.94595 | 18.0 |
| 24 | −41.827 | (Variable) | | |
| 25 | ∞ | 0.80 | 1.51633 | 64.1 |
| 26 | ∞ | 0.50 | | |
| Image plane | ∞ | | | |

Numerical Embodiment 5

Aspherical Surface data

Eleventh surface

K = −6.00511e+002    A4 = −3.47482e−005    A6 = −2.10099e−007

Thirteenth surface

K = 2.30042e+000    A4 = −1.82916e−004    A6 = −2.13114e−006
A8 = −1.06313e−008    A10 = −1.07559e−009

Fourteenth surface

K = −1.00023e+001    A4 = 6.90199e−005    A6 = −3.08796e−007

Various data
Zoom ratio 20.00

| | | | | |
|---|---|---|---|---|
| Focal length | 5.15 | 8.13 | 23.07 | 103.00 |
| F number | 2.87 | 3.11 | 3.30 | 3.91 |
| Half field angle | 37.9 | 26.3 | 9.49 | 2.15 |
| Image height | 3.49 | 3.88 | 3.88 | 3.88 |
| Total lens length | 105.66 | 98.67 | 111.64 | 122.17 |
| BF | 8.50 | 8.04 | 8.83 | 8.33 |
| d5 | 0.78 | 8.42 | 36.61 | 59.17 |
| d11 | 33.20 | 15.64 | 4.89 | 1.62 |
| d12 | 11.86 | 14.79 | 10.33 | 1.57 |
| d19 | 1.26 | 3.97 | 9.01 | 10.99 |
| d21 | 16.73 | 14.48 | 8.65 | 7.17 |
| d24 | 7.47 | 7.01 | 7.80 | 7.30 |

Zoom lens unit data

| Unit | First surface | Focal length |
|---|---|---|
| 1 | 1 | 80.90 |
| 2 | 6 | −9.85 |
| 3 | 13 | 15.85 |
| 4 | 20 | −19.56 |
| 5 | 22 | 17.52 |

Numerical Embodiment 6

Surface data

| Surface No. (i) | r | d | nd | vd |
|---|---|---|---|---|
| 1 | 114.980 | 1.20 | 1.90366 | 31.3 |
| 2 | 42.641 | 0.15 | | |
| 3 | 43.124 | 3.37 | 1.59282 | 68.6 |
| 4 | −192.018 | 0.16 | | |
| 5 | 35.490 | 2.61 | 1.60311 | 60.6 |
| 6 | 149.203 | (Variable) | | |
| 7 | 213.504 | 0.75 | 1.88300 | 40.8 |
| 8 | 8.812 | 4.04 | | |
| 9 | −21.897 | 0.65 | 1.71300 | 53.9 |
| 10 | 49.832 | 0.15 | | |
| 11 | 19.595 | 1.80 | 1.94595 | 18.0 |
| 12 | 154.459 | (Variable) | | |
| 13 (Stop) | ∞ | (Variable) | | |
| 14* | 11.364 | 2.98 | 1.58313 | 59.4 |
| 15* | −108.280 | 3.60 | | |
| 16 | 25.650 | 0.60 | 1.84666 | 23.9 |
| 17 | 10.138 | 0.49 | | |
| 18 | 15.249 | 2.07 | 1.48749 | 70.2 |
| 19 | −27.912 | 0.30 | | |
| 20 | ∞ | (Variable) | | |
| 21 | 165.797 | 0.60 | 1.48749 | 70.2 |
| 22 | 17.437 | 0.49 | | |
| 23 | 13.492 | 1.85 | 1.48749 | 70.2 |
| 24 | −193.547 | (Variable) | | |
| 25* | −75.848 | 0.75 | 1.55332 | 71.7 |
| 26 | 55.219 | 1.00 | | |

-continued

Numerical Embodiment 6

| 27 | ∞ | 0.80 | 1.51633 | 64.1 |
| 28 | ∞ | 0.50 | | |
| Image plane | ∞ | | | |

Aspherical Surface data

Fourteenth surface

K = 6.70000e−001  A4 = −1.05133e−004  A6 = −6.34101e−007
A8 = −1.04927e−008

Fifteenth surface

K = −1.00023e+001  A4 = 5.28572e−005

Twenty-fifth surface

K = −1.10605e+004  A4 = −3.01010e−004  A6 = 5.44350e−006

Various data
Zoom ratio 19.78

| Focal length | 5.50 | 9.80 | 24.50 | 108.80 |
| F number | 2.87 | 3.44 | 4.01 | 5.21 |
| Half field angle | 36.0 | 22.4 | 9.03 | 2.02 |
| Image height | 3.49 | 3.88 | 3.88 | 3.88 |
| Total lens length | 91.76 | 83.93 | 94.18 | 106.11 |
| BF | 2.03 | 2.03 | 2.03 | 2.03 |
| d6 | 0.70 | 5.50 | 22.50 | 41.00 |
| d12 | 33.27 | 20.21 | 10.24 | 2.60 |
| d13 | 9.90 | 5.86 | 3.58 | 1.35 |
| d20 | 1.70 | 6.17 | 11.66 | 14.98 |
| d22 | 8.77 | 8.18 | 4.96 | 11.18 |
| d24 | 7.26 | 7.85 | 11.07 | 4.85 |

Zoom lens unit data

| Unit | First surface | Focal length |
|---|---|---|
| 1 | 1 | 60.31 |
| 2 | 7 | −9.96 |
| 3 | 14 | 18.29 |
| 4 | 21 | −40.03 |
| 5 | 23 | 25.95 |
| 6 | 25 | −57.63 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-281431, filed Dec. 11, 2009, which is hereby incorporated by reference herein in its entirety.

What is claimed is:

1. A zoom lens, comprising, in order from an object side to an image plane side:
   a first lens unit having positive refractive power;
   a second lens unit having negative refractive power;
   an aperture stop;
   a third lens unit having positive refractive power;
   a fourth lens unit having negative refractive power; and
   a fifth lens unit having positive refractive power, wherein:
   during zooming from a wide angle end to a telephoto end, the first lens unit moves along a locus convex toward the image plane side, the second lens unit moves toward the image plane side, and the aperture stop moves;
   at the telephoto end compared with the wide angle end, an interval between the first lens unit and the second lens unit increases, an interval between the second lens unit and the third lens unit decreases, and an interval between the aperture stop and the third lens unit decreases; and
   the following conditional expressions are satisfied:

$$0.10 < |f4/ft| < 0.45; \text{ and}$$

$$0.03 < m1\text{mid}/|m1| < 0.70,$$

where f4 denotes a focal length of the fourth lens unit, ft denotes a focal length of an entire system at the telephoto end, m1 denotes a movement amount of the first lens unit in an optical axis direction during zooming from the wide angle end to the telephoto end, and m1mid denotes a movement amount of the first lens unit in the optical axis direction from the wide angle end to a zoom position at which the first lens unit is positioned closest to the image plane side.

2. A zoom lens according to claim 1, wherein the following conditional expression is satisfied:

$$0.05 < (dspw - dspt)/d23w < 0.40,$$

TABLE 1

Table 1

| Conditional expression | Numerical Embodiment 1 | Numerical Embodiment 2 | Numerical Embodiment 3 | Numerical Embodiment 4 | Numerical Embodiment 5 | Numerical Embodiment 6 |
|---|---|---|---|---|---|---|
| (1) | 0.379 | 0.159 | 0.138 | 0.151 | 0.190 | 0.368 |
| (2) | 0.163 | 0.182 | 0.265 | 0.163 | 0.423 | 0.545 |
| (3) | 0.236 | 0.233 | 0.096 | 0.127 | 0.228 | 0.198 |
| (4) | 15.2 | 18.1 | 19.3 | 20.6 | 15.7 | 11.0 |
| (5) | 81.5 | 81.5 | 81.5 | 81.5 | 95.1 | 68.6 |
| (6) Left side | 1.497 | 1.497 | 1.497 | 1.497 | 1.434 | 1.593 |
| (6) Right side | 1.478 | 1.478 | 1.478 | 1.478 | 1.410 | 1.542 |
| (7) | 2.57 | 2.37 | 2.17 | 2.19 | 2.69 | 2.59 |
| (8) | −7.65 | −8.10 | −8.10 | −8.40 | −8.22 | −6.06 |
| (9) | 6.93 | 11.35 | 8.78 | 8.47 | 3.40 | 4.72 |
| (10) | 23.13 | 18.74 | 17.93 | 18.16 | 24.12 | 18.46 |
| (11) | −1.795 | −2.377 | −2.262 | −2.287 | −0.394 | −0.553 |
| (12) | 1.054 | 1.000 | 1.088 | 1.097 | 0.980 | 1.000 | where dspw and dspt each denote: an interval between the aperture stop and a lens surface of the third lens unit that is closest to the object side at the wide angle end;

and an interval between the aperture stop and the lens surface of the third lens unit that is closest to the object side at the telephoto end, and d23w denotes an interval between a lens surface of the second lens unit that is closest to the image plane side and the lens surface of the third lens unit that is closest to the object side at the wide angle end.

3. A zoom lens according to claim 1, wherein the following conditional expression is satisfied:

$$8.0 < f1/fw < 30.0,$$

where f1 denotes a focal length of the first lens unit, and fw denotes a focal length of the entire system at the wide angle end.

4. A zoom lens according to claim 1, wherein:
the first lens unit comprises one or more positive lenses; and
the following conditional expressions are satisfied:

$$vd1p > 65.0; \text{ and}$$

$$nd1p > -0.0050 \cdot vd1p + 1.885,$$

where nd1p denotes a refractive index on a d-line of a material of a positive lens disposed closest to the object side, and vd1p denotes an Abbe number of the material.

5. A zoom lens according to claim 1, wherein the following conditional expression is satisfied:

$$1.5 < (\beta 2t/\beta 2w)/(\beta 3t/\beta 3w) < 5.0,$$

where β2w and β2t denote lateral magnifications of the second lens unit at the wide angle end and at the telephoto end, respectively, and β3w and β3t denote lateral magnifications of the third lens unit at the wide angle end and at the telephoto end, respectively.

6. A zoom lens according to claim 1, wherein the following conditional expression is satisfied:

$$-12.0 < f1/f2 < -4.0,$$

where f1 denotes a focal length of the first lens unit, and f2 denotes a focal length of the second lens unit.

7. A zoom lens according to claim 1, wherein the following conditional expression is satisfied:

$$2.0 < f5/fw < 15.0,$$

where f5 denotes a focal length of the fifth lens unit, and fw denotes a focal length of the entire system at the wide angle end.

8. A zoom lens according to claim 1, wherein the following conditional expression is satisfied:

$$10 < (\beta 2t \cdot \beta 3t)/(\beta 2w \cdot \beta 3w) < 40,$$

where β2w and β2t denote lateral magnifications of the second lens unit at the wide angle end and at the telephoto end, respectively, and β3w and β3t denote lateral magnifications of the third lens unit at the wide angle end and at the telephoto end, respectively.

9. A zoom lens according to claim 1, wherein the following conditional expression is satisfied:

$$-3.5 < m1/m2 < 0.0,$$

where m2 denotes a movement amount of the second lens unit in the optical axis direction at the telephoto end from the wide angle end.

10. A zoom lens according to claim 1, wherein the following conditional expression is satisfied:

$$0.7 < BFt/BFw < 1.3,$$

where BFw and BFt denote back focuses at the wide angle end and at the telephoto end, respectively.

11. A zoom lens according to claim 1, wherein the fourth lens unit consists of one lens component.

12. A zoom lens according to claim 1, wherein the fifth lens unit consists of one lens component.

13. A zoom lens according to claim 1, which forms an image on a solid-state image pickup element.

14. An image pickup apparatus, comprising:
the zoom lens according to claim 1; and
a solid-state image pickup element which receives a light image formed by the zoom lens.

\* \* \* \* \*